US007493241B2

(12) United States Patent
Lee

(10) Patent No.: US 7,493,241 B2
(45) Date of Patent: Feb. 17, 2009

(54) 3D VELOCITY MODELING, WITH CALIBRATION AND TREND FITTING USING GEOSTATISTICAL TECHNIQUES, PARTICULARLY ADVANTAGEOUS FOR CURVED FOR CURVED-RAY PRESTACK TIME MIGRATION AND FOR SUCH MIGRATION FOLLOWED BY PRESTACK DEPTH MIGRATION

(76) Inventor: Wook B. Lee, 2727 Saint Anne's Dr., Sugarland, TX (US) 77479

( * ) Notice: Subject to any disclaimer, the term of this patent is extended or adjusted under 35 U.S.C. 154(b) by 259 days.

(21) Appl. No.: 10/564,895

(22) PCT Filed: Jul. 22, 2004

(86) PCT No.: PCT/US2004/023456

§ 371 (c)(1),
(2), (4) Date: May 23, 2006

(87) PCT Pub. No.: WO2005/010797

PCT Pub. Date: Feb. 3, 2005

(65) Prior Publication Data

US 2007/0021951 A1  Jan. 25, 2007

(51) Int. Cl.
*G06F 17/50* (2006.01)
*G06G 7/48* (2006.01)
(52) U.S. Cl. .................. 703/2; 703/6; 703/10; 382/9; 706/928; 367/73
(58) Field of Classification Search .............. 703/2, 703/10, 6; 702/14; 367/73; 345/420; 706/928
See application file for complete search history.

(56) References Cited

U.S. PATENT DOCUMENTS 4,992,996 A   2/1991   Wang et al.

(Continued)

OTHER PUBLICATIONS

Wook B. Lee and Wenlong Xu, 3-D Geosttistical Velocity Modeling: Salt Imaging in a Geopressured Environment, Reprinted from the Jan. 2000 issue The Leading Edge.

(Continued)

*Primary Examiner*—Thai Phan
(74) *Attorney, Agent, or Firm*—Shaper Ile, LLP; Sue Z. Shaper

(57) ABSTRACT

A method of constructing a 3D geologically plausible velocity model for efficient and accurate prestack imaging wherein embodiments of the invention provide: (1) a method of calibrating velocity functions, appropriately and effectively taking into account well (hard) and seismic (soft) data as well as geological features, and trend fitting ("iDEPTHing") RMS velocities before curved-ray prestack time migration; (2) a method of calibrating and trend fitting ("iDEPTHing") interval velocities before prestack depth migration, appropriately and effectively taking into account well (hard) and seismic (soft) data as well as geological features; and (3) a method of constructing a geologically plausible velocity model using the previous steps of velocity calibration and trend fitting RMS and interval velocities, for efficient sequential use in prestack time migration followed by prestack depth migration. Advantages of the embodiments include providing a quick turnaround of prestack time and depth migration to interpreters and cutting back resource-intensive interpretation efforts for 3D seismic data The invention has significant implications for improving aspects of oil and gas exploration and production technologies, including pore pressure prediction, prospect evaluation and seismic attribute analysis.

35 Claims, 18 Drawing Sheets

U.S. PATENT DOCUMENTS

| | | |
|---|---|---|
| 5,089,994 A | 2/1992 | Harlan et al. |
| 5,229,940 A | 7/1993 | Wang et al. |
| 5,444,619 A | 8/1995 | Hoskins et al. |
| 5,513,150 A | 4/1996 | Sicking et al. |
| H1529 H | 5/1996 | Schneider, Jr. et al. |
| 5,583,825 A | 12/1996 | Carrazzone et al. |
| 5,696,735 A | 12/1997 | Krebs |
| 5,838,634 A * | 11/1998 | Jones et al. ............. 367/73 |
| 5,966,672 A | 10/1999 | Knupp |
| 6,002,642 A | 12/1999 | Krebs |
| 6,131,071 A | 10/2000 | Partyka et al. |
| 6,253,157 B1 | 6/2001 | Krebs |
| 6,278,948 B1 | 8/2001 | Jorgensen et al. |
| 6,289,285 B1 | 9/2001 | Neff et al. |
| 6,311,133 B1 | 10/2001 | Lailly et al. |
| 6,388,947 B1 * | 5/2002 | Washbourne et al. ......... 367/73 |
| 6,418,380 B1 | 7/2002 | Pica |
| 6,424,918 B1 | 7/2002 | Jorgensen et al. |
| 6,430,507 B1 | 8/2002 | Jorgensen et al. |
| 6,430,510 B1 | 8/2002 | Thomas et al. |
| 6,466,873 B2 | 10/2002 | Ren et al. |
| 6,480,790 B1 * | 11/2002 | Calvert et al. ............. 702/14 |
| 6,493,634 B1 | 12/2002 | Krebs et al. |
| 6,502,037 B1 | 12/2002 | Jorgensen et al. |
| 6,519,532 B2 | 2/2003 | Meng |
| 7,292,241 B2 * | 11/2007 | Thore et al. ............. 345/420 |
| 2002/0055888 A1 | 5/2002 | Dusevic et al. |
| 2002/0180732 A1 | 12/2002 | Docherty |
| 2003/0060981 A1 | 3/2003 | Routh et al. |
| 2004/0064294 A1 * | 4/2004 | Van Riel et al. ............. 702/189 |

OTHER PUBLICATIONS

Brooke J. Carney, Building Velocity Models for Steep-Dip Prestack Depth Migration through First Arrival Traveltime Tomography, Nov. 2000, Blacksburg, VA.

Michael E. Kenney and Wook B. Lee, Velocity Calibration for 3D Prestack Time Migration: A Prerequesite for Velocity Depth Modeling, SEG Expanded Abstract, Oct. 2003.

Wook B. Lee, Seislink Corporation, Velocity Calibration and Trending-Fitting Procedures for Seismic Depth Imaging and Interpretation.

* cited by examiner

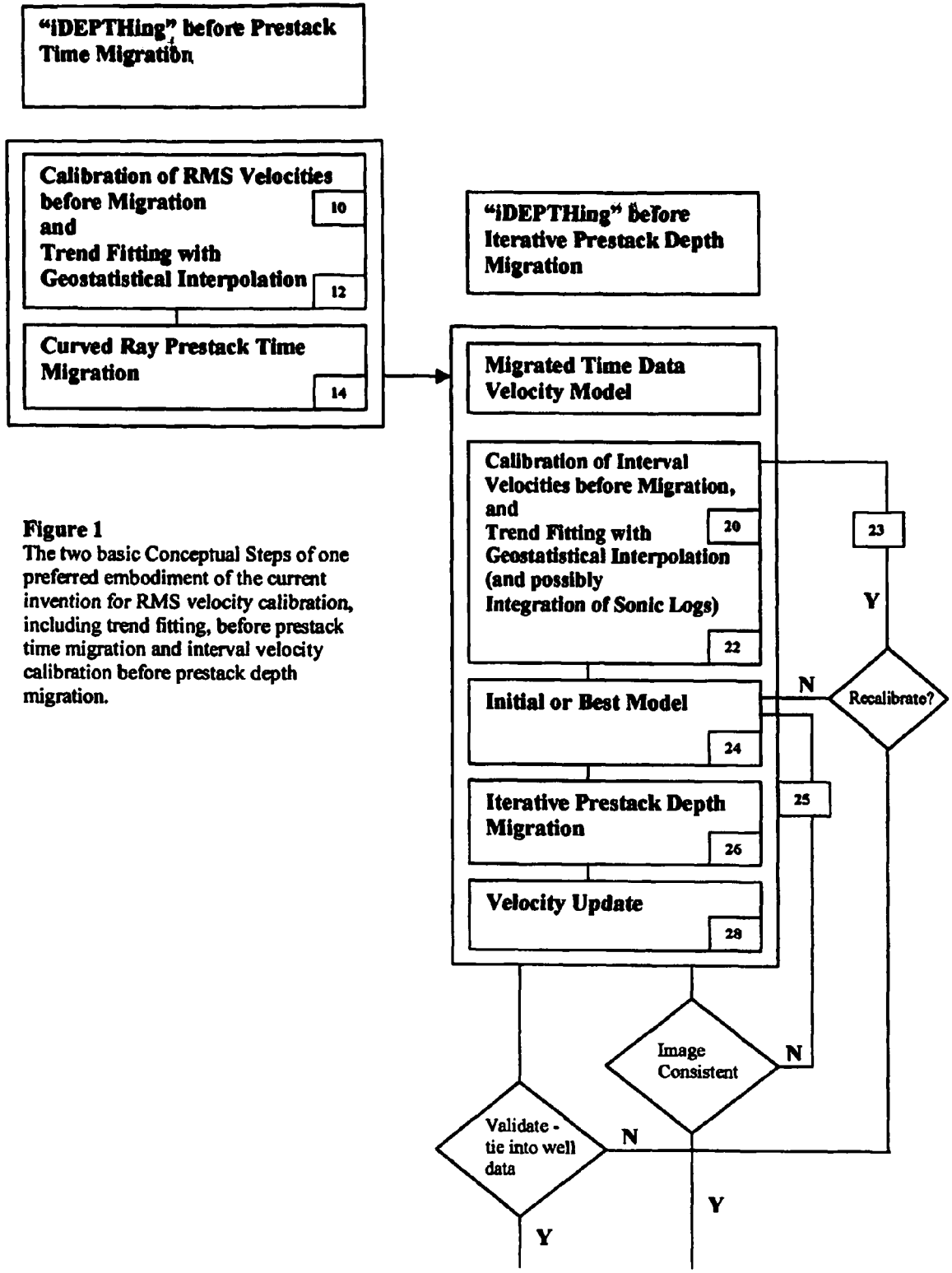

Velocity Calibration and Trend Fitting, before Curved Ray Prestack Time Migration [30]

Edit [40]

- [41] Compute RMS velocity and Interval Velocities from selected seismic data location and sample depth:

Edit RMS and Interval Velocities, using geological constraints to extent available.

- [42] Resample and apply least-square filter to RMS velocities. Edit RMS velocities and interval velocities using interactive dual windows.

- [43] Select Stratigraphic Horizons.

Figure 2
The Steps for Velocity Calibration and Trend Fitting ("iDEPTHING") before Curved-Ray Prestack Time Migration.

Calibration [56]

- [44] Compute variogram models for velocity trends from seismic velocities.

- [45] For calibrating RMS velocity for curved ray prestack time migration, geostatistical Kriging is to be used for interpolation of scale factors to RMS velocity locations.

- [46] Edit checkshot and/or other (hard) well data.

- [47] Compute (RMS and/or Interval) velocities from hard data.

- [48] Interpolate seismic velocities to locations of (hard) well data.

- [49] Compute scale factor.

- [50] Interpolate scale factors using Kriging.

- [51] Compute calibrated RMS velocities.

Further Trend Fitting [52]

- [53] Match time slice of seismic velocities with geologic trends.

- [54] Compute variogram models and match with geologic trends.

- [55] Interpolate RMS velocities using Kriging.

The Steps for Constructing a Geologically Plausible Velocity Modeling for Prestack Depth Migration.

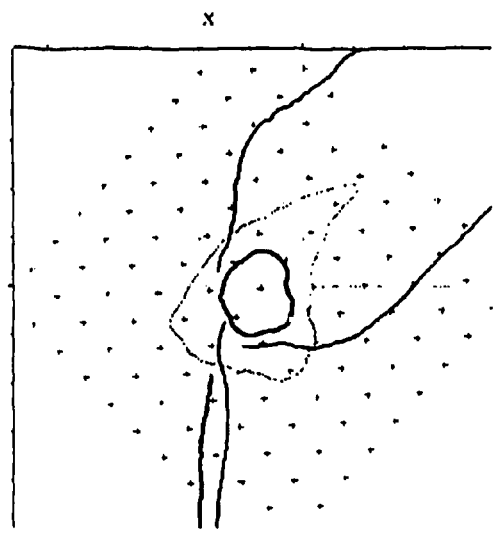
(a) Base Map
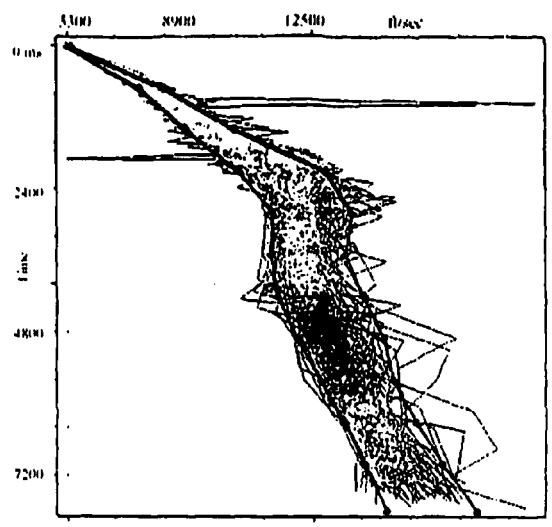
(b) Interval Velocity
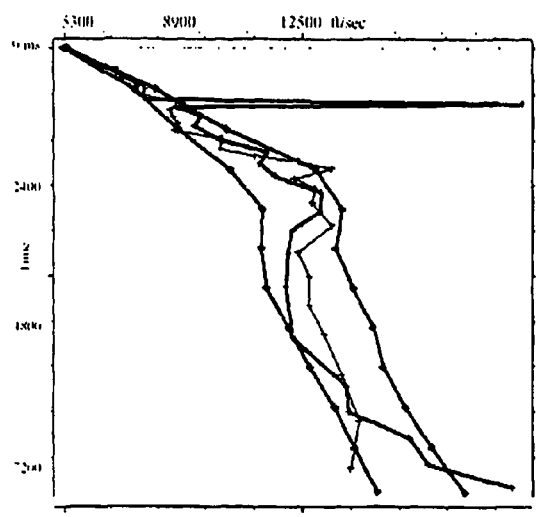
(c) Interval Velocity
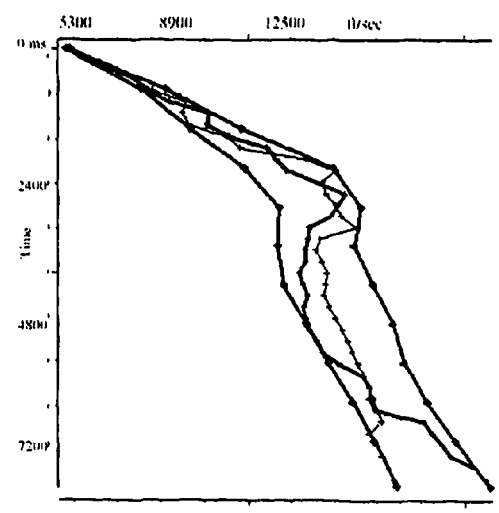
(d) Interval Velocity
Figure 5

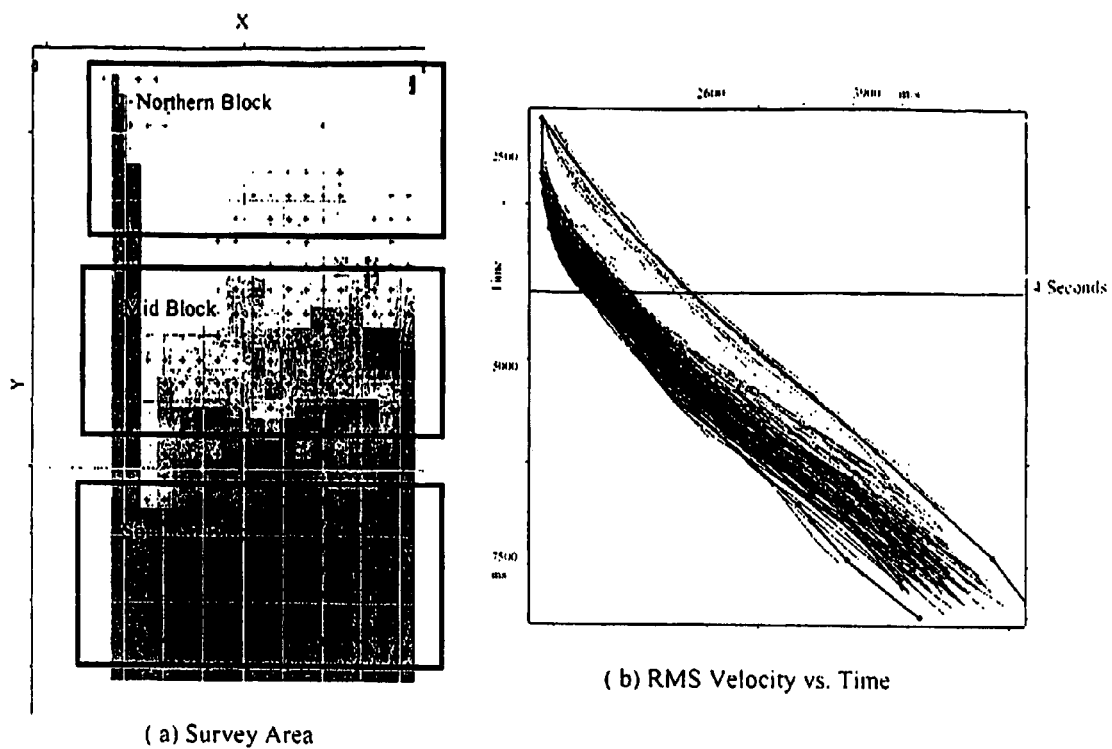
(a) Survey Area
(b) RMS Velocity vs. Time
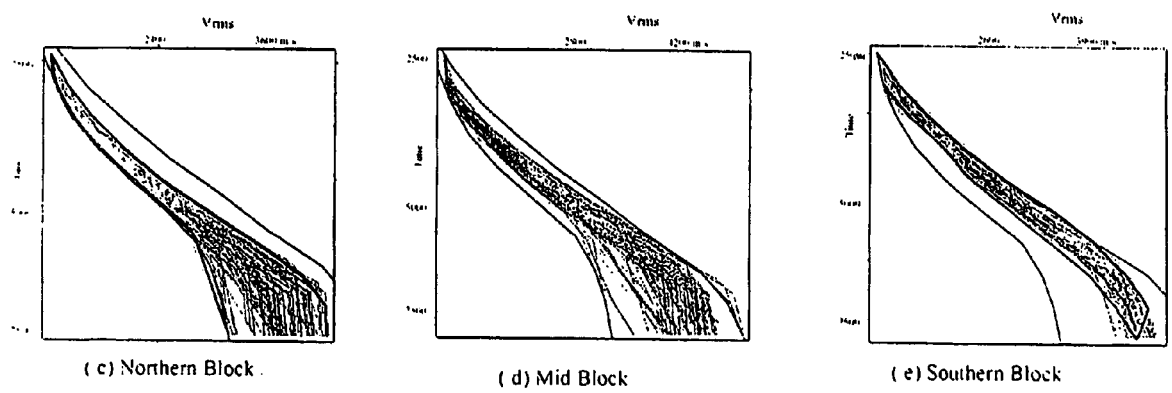
(c) Northern Block
(d) Mid Block
(e) Southern Block
Figure 6

(a) Time vs. Depth
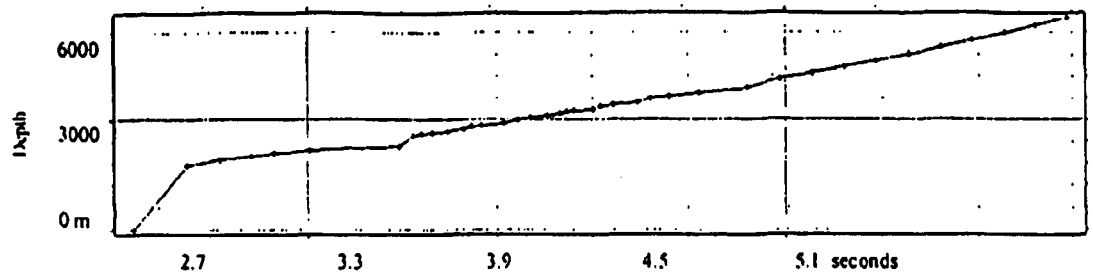
(b) Time vs. Checkshot_Average_Velocity
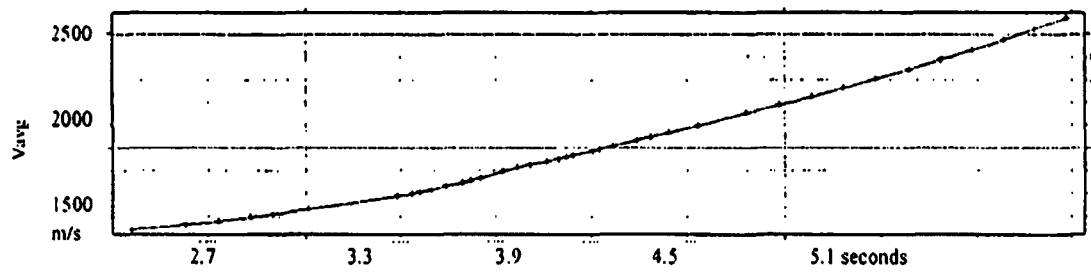
(c) Time vs. Checkshot_Interval_Velocity
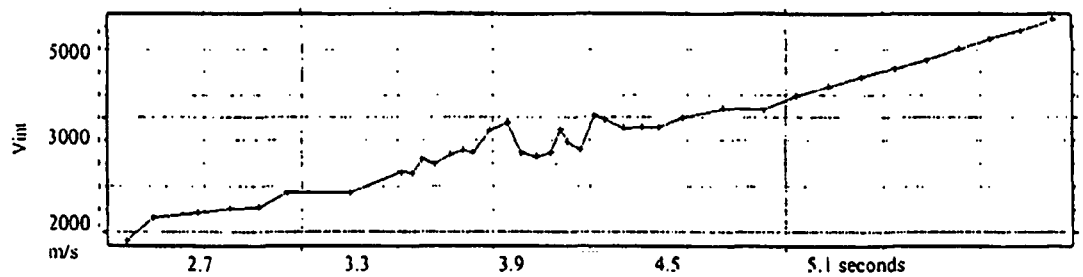
Figure 8

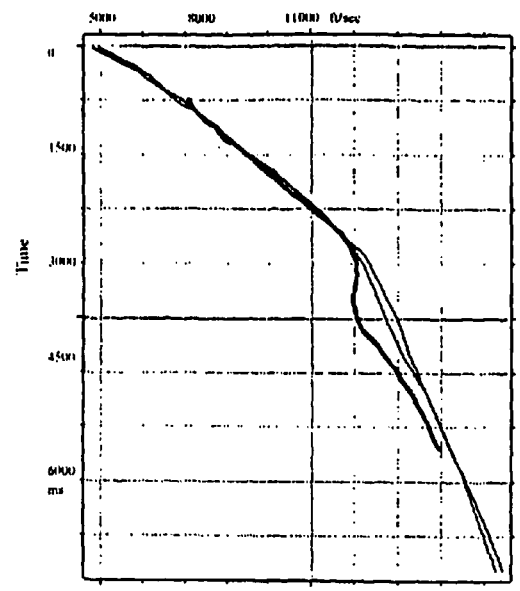
(a) Average Velocity
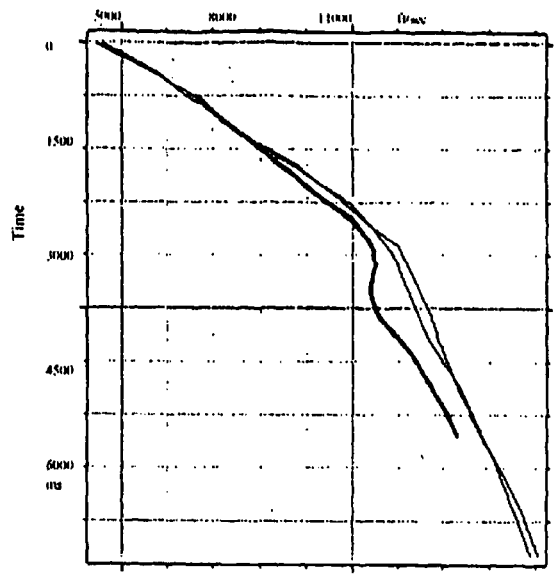
(b) RMS Velocity
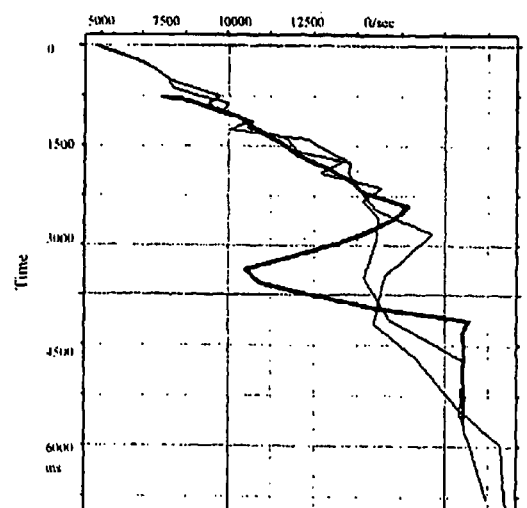
(c) Interval Velocity
Figure 9 Checkshot Velocity

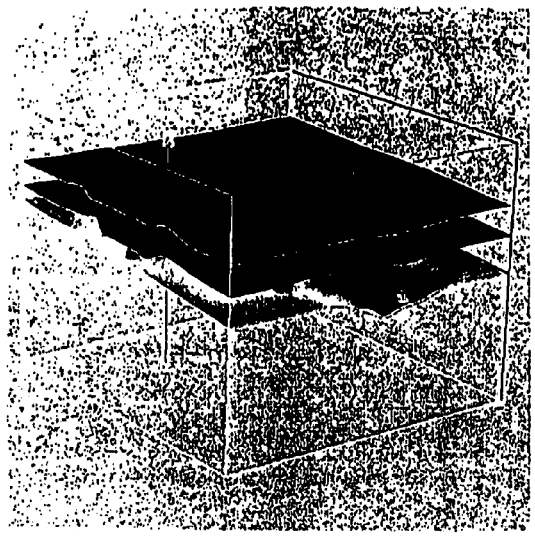
(a) Stratigraphic Surfaces
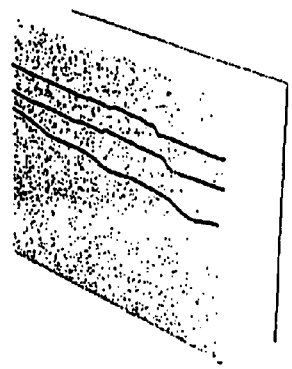
(b) Cross Section
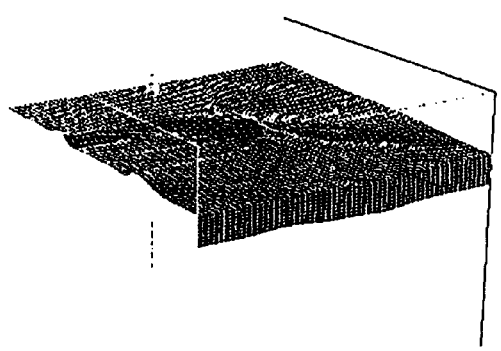
(c) Upper Stratigraphic Unit
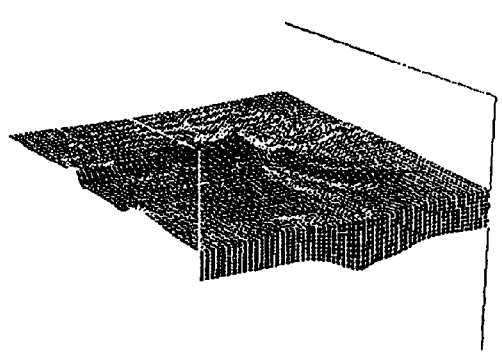
(d) Lower Stratigraphic Unit
Figure 10

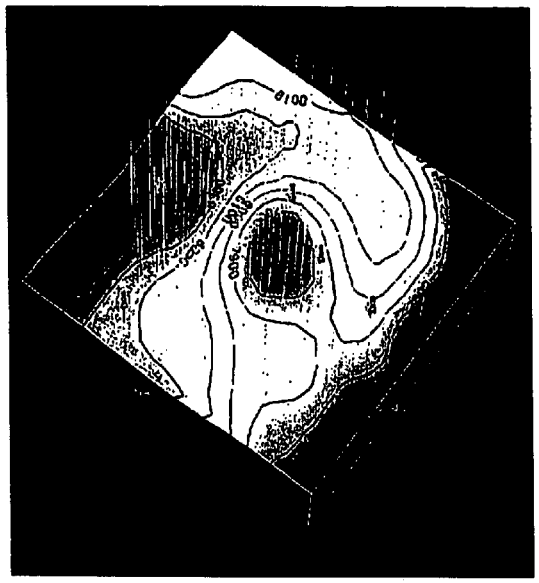
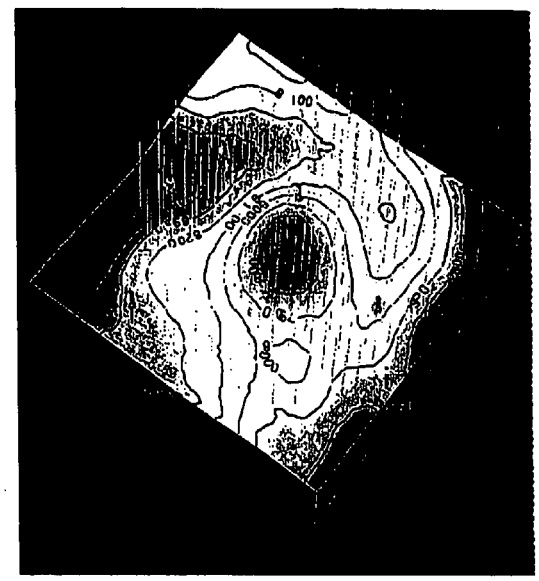
(a) Pre-calibration Seismic Velocity
(b) Post-calibration Seismic Velocity
| Well | Seismic Velocity | Well Velocity | Scale Factor | Calibrated Velocity | Marker Depth |
|---|---|---|---|---|---|
| 1 | 7941.8 | 8009.305 | 1.0085 | 8009.55 | 5055.46 |
| 2 | 7830.99 | 7834.905 | 1.0005 | 7834.94 | 4730.72 |
| 3 | 7842.7 | 7874.855 | 1.0041 | 7875.18 | 4790.81 |
| 4 | 8316.04 | 8324.19 | 1.00098 | 8324.12 | 5590.71 |
| 5 | 8537.02 | 8356.035 | 0.97879 | 8356 | 6077.98 |
| 6 | 8226.63 | 8274.591 | 1.00583 | 8274.6 | 5641.66 |
(c) Calibration Table: Velocities before and after calibration
Figure 11

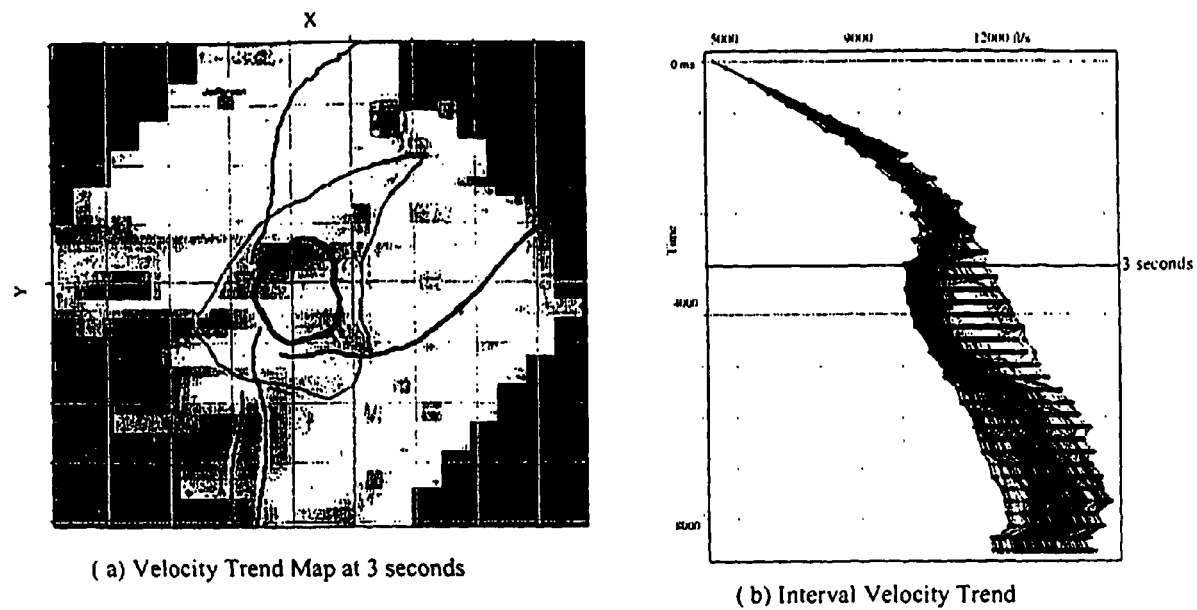
(a) Velocity Trend Map at 3 seconds
(b) Interval Velocity Trend
Figure 12
Figure 13 Variogram Map

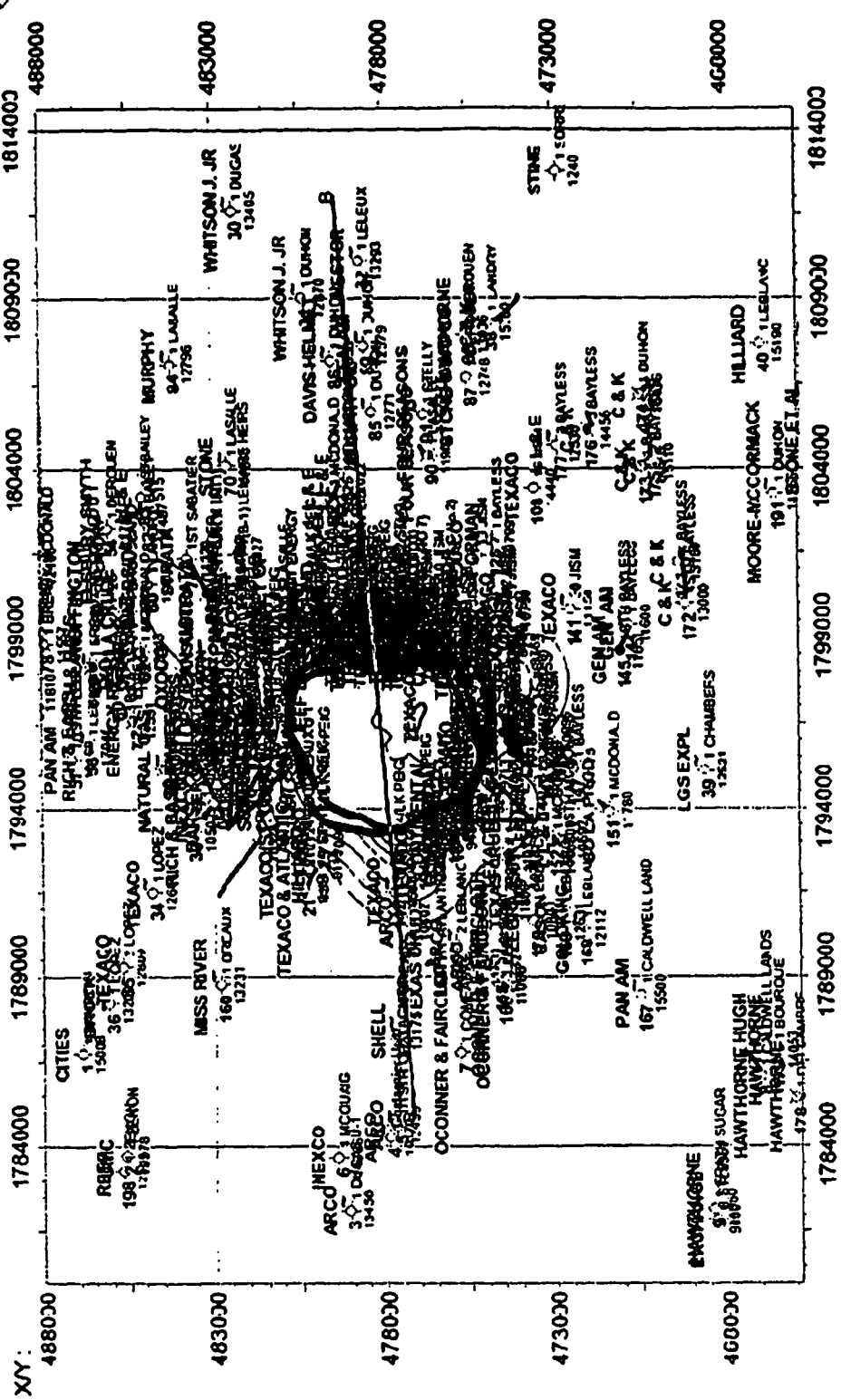
Figure 14 (a) Base Map

Figure 14 (b) Seismic Section A to B

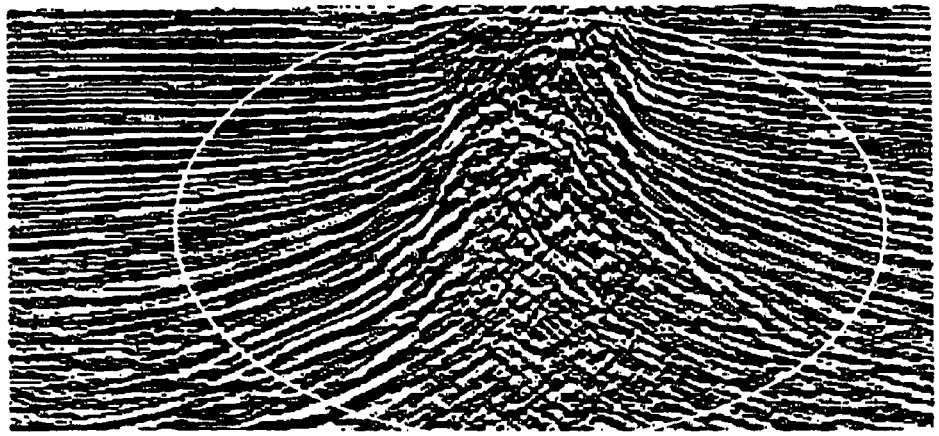
Figure 15 (a) 1999 Prestack Time Migration
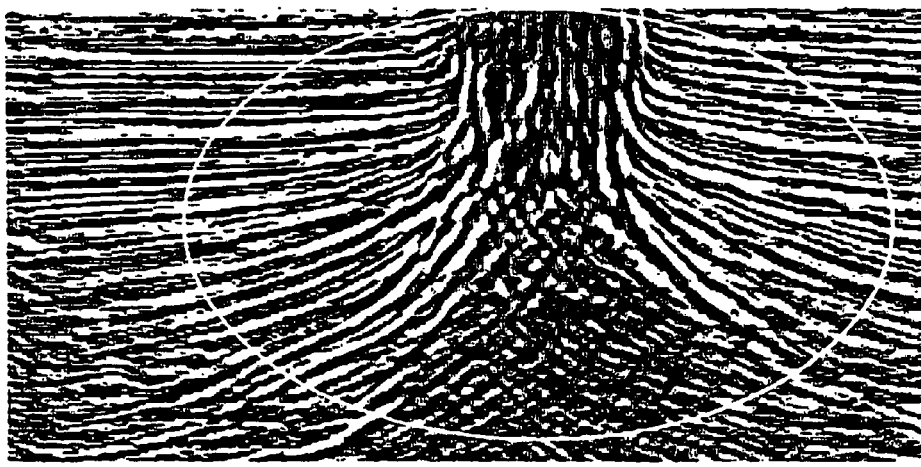
Figure 15 (b) 2003 Prestack Time Migration

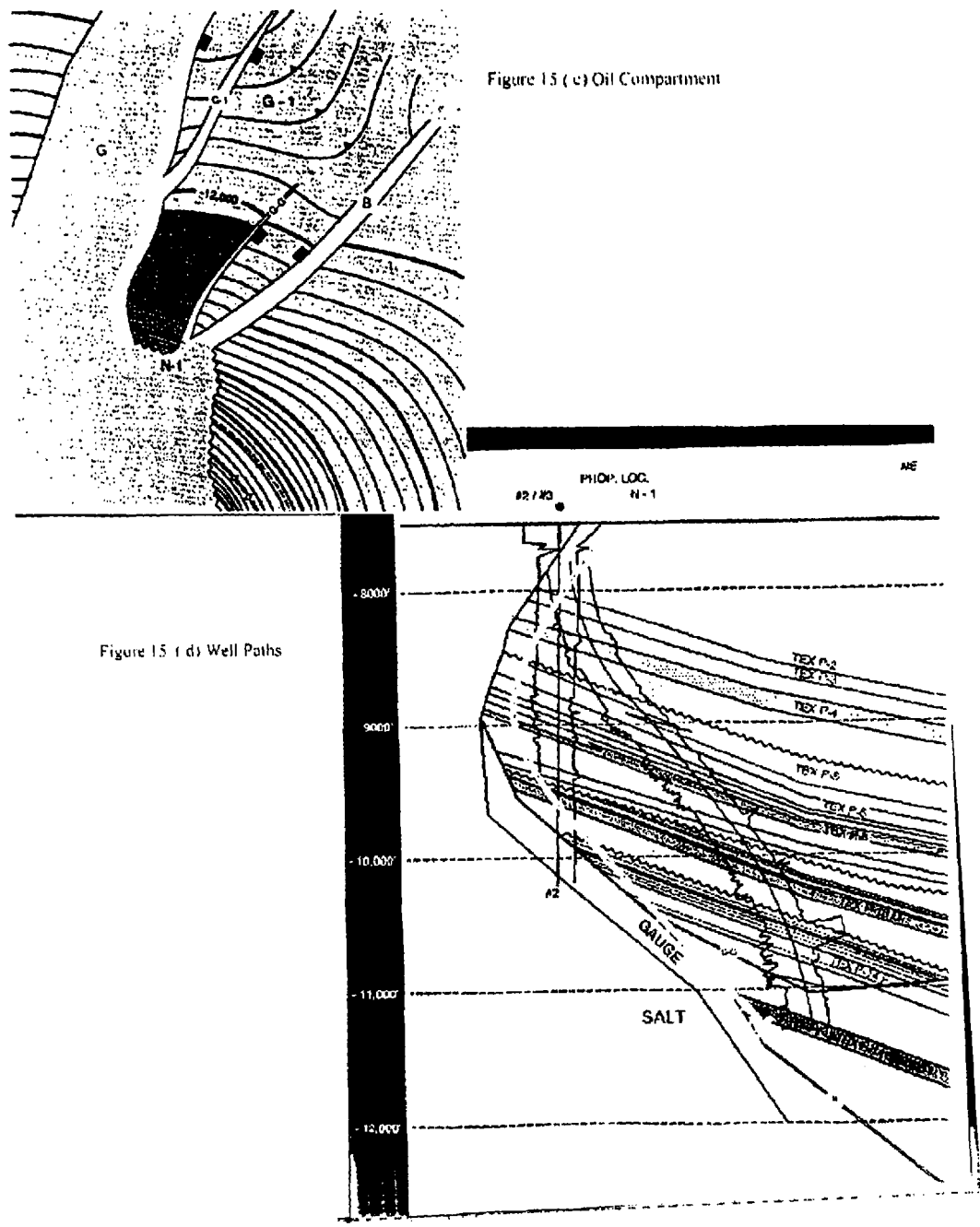
Figure 15 (c) Oil Compartment
Figure 15 (d) Well Paths

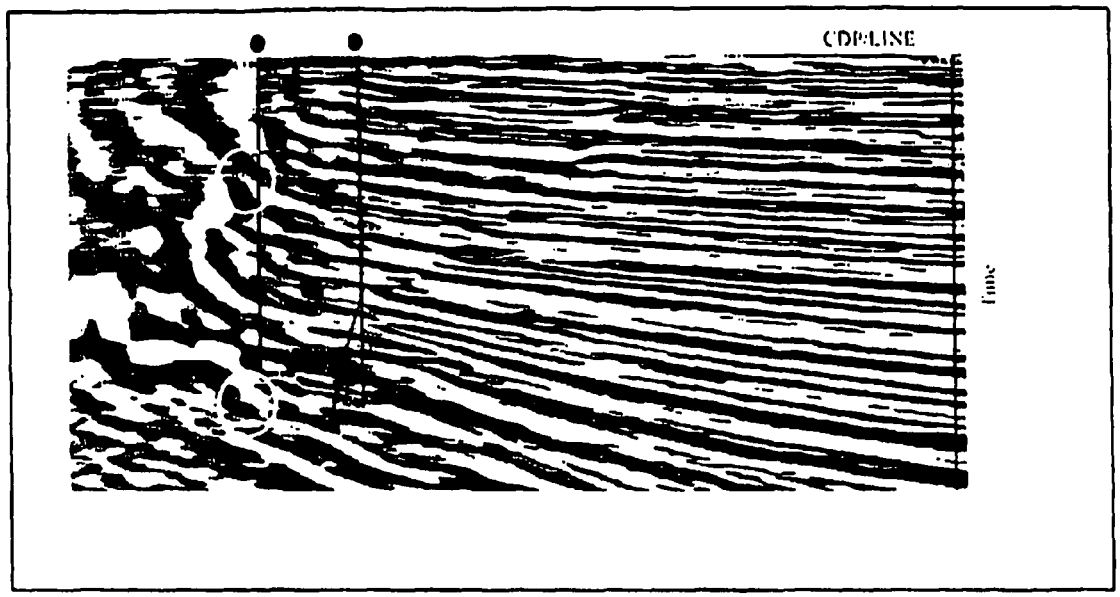
Figure 16 (a) Prestack Time Migration without Velocity Calibration and Trend Fitting
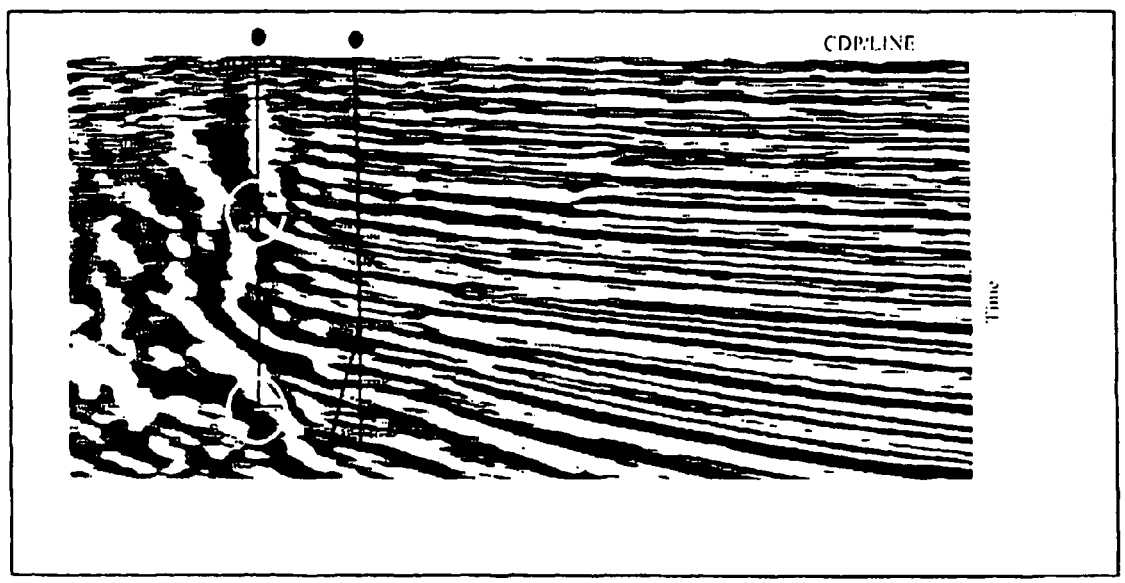
Figure 16 (b) Prestack Time Migration with Velocity Calibration and Trend Fitting

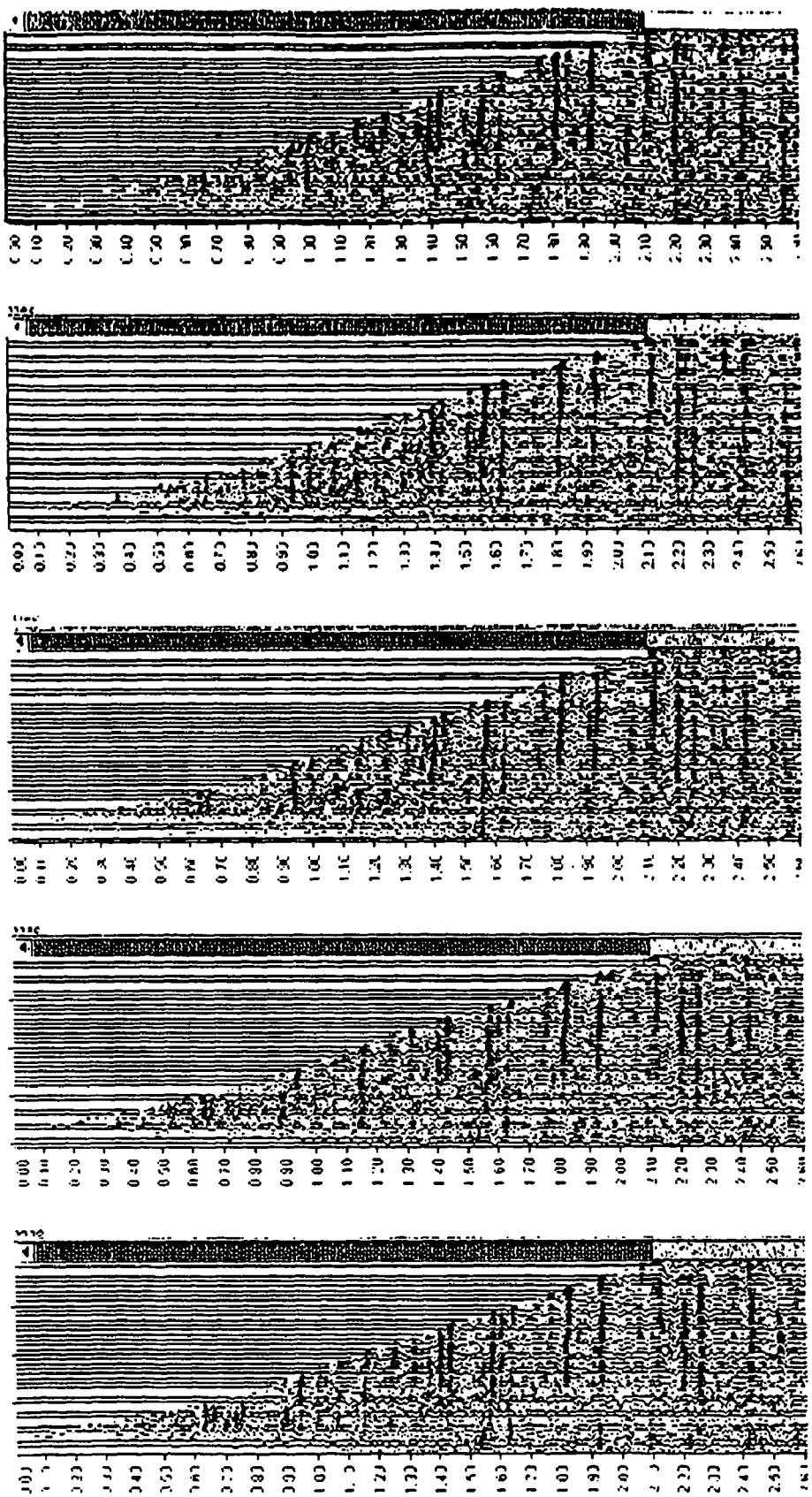
Figure 17 Common Image Point Gathers

3D VELOCITY MODELING, WITH CALIBRATION AND TREND FITTING USING GEOSTATISTICAL TECHNIQUES, PARTICULARLY ADVANTAGEOUS FOR CURVED FOR CURVED-RAY PRESTACK TIME MIGRATION AND FOR SUCH MIGRATION FOLLOWED BY PRESTACK DEPTH MIGRATION

FIELD OF THE INVENTION

This invention relates to improved methods for building geologically plausible 3D velocity models for use in 3D prestack seismic imaging, in particular for use in curved-ray prestack time migration and in such migration followed by prestack depth migration, and including utilizing geologic data and geostatistical techniques for integrating velocity information derived from seismic data, so called "soft data", with well data, or so called "hard data", such as checkshot surveys and sonic logs.

BACKGROUND OF THE INVENTION

Introduction

In seismic exploration seismic reflection data from subsurface layers are collected by multiple receivers typically at the earth's surface. The more recent 3D seismic acquisitions cover large areas, collecting extensive 3D seismic data for use in subsurface imaging.

Seismic "migration" corrects and improves initial assumptions of near horizontal layering in an attempt to model geophysical realities such as dips, discontinuities, and curvature of formations. Seismic migration is typically the culmination of the image processing for the seismic data, with the goal of producing detailed pictures for use in the interpretation of subsurface geologic structures. Such detailed pictures are important for prospect generation and reservoir characterization, such as lithology, fluid prediction, and pore pressure prediction, as well as for reservoir volume estimation.

3D seismic interpretation of migrated data aspires to produce an accurate mapping of the subsurface structures, important for oil and gas exploration. Such seismic interpretation profits from an improved focusing and positioning of subsurface reflectors in the migrated data. It is one disclosure of the instant invention that such improved focusing and positioning can be made possible by migrating the data with a more realistic velocity model.

Seismic migration of 3D prestack seismic data is practiced in two forms, time migration and depth migration. Each requires a 3D velocity model, a description of acoustic velocity structures. Time migration is simpler, less resource intensive and considered to be less accurate and less sophisticated. Historically, the industry has not been bothered to build a sophisticated geologically plausible velocity model prior to prestack time migration, relying instead on simple assumptions deemed to be fitting the technique regarded as less accurate. For accuracy, the industry currently looks to time and resource intensive "depth migration", a technique utilizing massive interations to converge on solutions.

One disclosure of the instant invention is that, surprisingly, an effective and efficient focusing and positioning of subsurface reflectors is achievable by seismic time migration, but such results are highly dependant on the accuracy of the 3D velocity model employed therein. In particular, a geologically realistic, accurate 3D velocity model produces surprisingly good results when used with curved ray prestack time migration.

The relatively new 3D seismic depth imaging services, techniques that have opened a rapidly growing market in recent years, are at present highly interpretive, quite expensive and very complex processing jobs. They carry the promise of illuminating complicated oil traps under geologic complications, such as sub-sak prospects in deep water so that to economize on the high cost of drilling in deep water, such better seismic imaging technology is in demand. However, reducing the cost and time of such complex processing is therefore also important. One disclosure of the instant invention is a methodology that so reduces the cost and time.

Interpreters are historically given the task of tying well markers to 3D seismic data. Calibrating velocity models derived from seismic data and used for migration by tying into well information (hard data) has been historically deemed the interpreter's task, preformed post migration. Inconsistencies between processing velocities and the depth tying velocities, however, create formidable challenges at the interpretation stage. It is a significant improvement of the instant invention to have previously dealt with this calibration issue, prior to and/or during migration.

The instant invention provides a better solution, to both imaging and tying well information. More focused seismic data, produced as a result of early velocity calibration with hard data and geologic data and the use of geostatistically sensitive trend fitting (together referred to as "iDEPTHing") prior to migration, as taught herein, restores better signal-to-noise ratio for deeper exploration. By utilizing the methods of the instant invention curved-ray prestack time migration provides excellent migrated seismic data quickly to interpreters, and provides superior preliminary data for constructing a 3D velocity model for prestack depth migration.

Summary of State of the Industry

The current industry practice of prestack depth migration is best described by John W. C. Sherwood (Sherwood, 1989); "How can we routinely, efficiently, and economically extract interval velocities with the accuracy need for depth inversion? . . . . First, an educational estimate of the interval velocities is made. This is used to create, from the regular stacked (may be migrated) section, an approximate depth-interval velocity model. This first guess is going to be wrong. But the data can be processed on the basis of this model using a full pre-stack depth migration. Then the data are examined and a determination is made of how well it is focused. If they don't appear to be focused properly, the model can be adjusted, both the depths and the interval velocities, to bring the data into better focus. The adjustment is repeated until the results are satisfactory. The procedure is today being used very intensively by some companies." An abundance of articles on the subject of iterative prestack depth migration have been published for the last 20 years (Wang et. al., 1991; Lee and Zhang, 1992; MacKay and Abma, 1992; Liu, 1997).

U.S. Pat. No. 4,992,996, entitled "Interval velocity analysis and depth migration using common reflection point gathers" relates to a method of performing velocity analysis while eliminating the effects on weak signals caused by stronger signals with an assumption that assumes that the initial velocity model is reasonably correct and geologically plausible. The current invention provides a method for providing such a needed geologically plausible initial velocity model.

The iterative technique of depth migration often fails to converge, and it often fails to provide prospects with its economics within reasonable ranges of error for drilling. The iterative technique is based on the assumption that all iterations will converge to a unique solution most of the times.

However, these iterations will converge to a geologically acceptable solution only when the initial model is geologically plausible. And, as Sherwood stated, the initial model is going to be wrong most of the times: the target depth is often wrong based on the result of iteration. Again, the current invention provides a method for providing such a needed geologically plausible initial velocity model.

Another favorite assumption is that imaging velocities are different from velocities for depth conversion due to anisotropy. It has been assumed that seismic velocities are in general 2-13% faster than the well average velocities (Guzman et. Al., 1997). However, considering errors in seismic velocity measurements 5-10%, anisotropy cannot be so easily assumed. Based on hyperbolic moveout, vertical velocity gradients and velocity trend reversal will be a significant source of errors. Small errorsin stacking velocities will be amplified in converting to interval velocities.

As a reference for geophysical solutions being non-unique based on geophysical data collected on earth surface, Al-Chalabi anabzed explicitly the non-uniqueness in velocity-depth curve in his article (Al-Chalabi 1997). He pointed out that the errors in measuring velocities from semblance clouds make the problem even worse. However, the current industry practice assumes the existence of a unique or true solution. The current invention deals with velocity calibration in an improved manner in order to reduce inaccuracies in seismic velocities and non-uniqueness.

U.S. Pat. No. 5,089,994, entitled "Tomographic estimation of seismic transmission velocities from constant offset depth migrations" relates to a method for improving velocity models so that constant-offset migrations estimate consistent positions for reflectors, including tomographic estimations of seismic transmission velocities from constant-offset depth migrations. This costly method has a fundamental problem of non-uniqueness between layer velocities and layer boundary positions. The current invention is a prerequisite to reasonable tomographic estimation.

U.S. Pat. No. 5,513,150, entitled "Method of determining 3-D acoustic velocities for seismic surveys" relates to a method of producing a velocity volume for a seismic survey volume, based on two-way time seismic data and process velocity data. This method provides a hand-on interactive tool for velocity editing but does not recognize the importance of velocity calibration.

Constructing improved velocity models requires all different sources of velocity data. Inaccurate seismic velocity (soft) data are abundant and reliable well data (hard) data are sparse. Most of the times, inconsistencies between seismic and well data are observed. Mostly the inconsistencies between different sources of velocity data are attributed to some unexplained physical mechanism. However, it is difficult to access any physical mechanism due to inaccuracies in seismic velocity measurements. The following patent stated that the inconsistencies might come from anisotropy.

U.S. Pat. No. 6,253,157, entitled "Method for efficient manual inversion of seismic velocity information", relates to a method of calculating seismic velocity for migration purposes as a function of subsurface spatial position that gives the seismic processing analyst direct control of the resulting migration velocity model. This method recognizes the different sources of velocity information and the strengths of one source often offset the weaknesses of one another. It states that different velocity information sources usually give inconsistent estimates of the instantaneous velocity and interpreted that this inconsistency may be due to anisotropy that is being ignored.

Anisotropy is difficult to measure because it can only be measured in the laboratories. Laboratory measurements indicating that there were significant intrinsic anisotropy was observed in West Africa, and anisotropy migration is required for both improved imaging and accurate positioning in such cases.

U.S. Pat. Nos. 5,696,735 and 6,002,642, entitled "Seismic migration using offset checkshot data" relates to a method of migrating seismic data using offset checkshot survey measurements. This method uses direct travel time measurement from offset checkshot survey instead of a 3D velocity model. Although, such offset checkshot surveys are not commonly available, they may be advantageously used in special situations for shear wave imaging of dipping reflectors.

Development of Instant Invention

It was postulated that velocity models constructed according to current industry standards could be too smooth for depth imaging and sometimes wipe out key prospects. Excessive smoothing in velocity modeling could be a consequence of embedded velocity errors. Often layer boundaries were interpreted based on over-migrated or under-migrated results. It was detrimental to include erroneous boundaries in a velocity model.

A variation of the collocated Co-Kriging method was early on tested by the instant inventor on post-stack seismic data for modeling geologic features such as geo-pressure zones. The collocated Co-Kriging method showed that it could incorporate big local anomalies with smooth transition boundaries (Lee and Xu, 2000), integrating seismic (soft) data and well (hard) data by the zone of influence according to variances. Calibration was used in the test to tie wells for post-stack depth migration. Focusing or residual velocity or focusing errors could not be determined with post-stack data. The primary purpose of the post-stack depth migration was to correct positioning errors.

In a recent subsequent test, in accordance with the instant invention, velocity calibration to hard and geologic data and geologically sensitive trend fitting (together referred to as "iDEPTHing") was incorporated in constructing a geologically plausible velocity model for preslack time/depth migration. The test showed that curved-ray prestack time migration based on such velocity model gave astonishingly ("eureka") good results in terms of imaging steeply dipping seismic events and tying well markers (Kenney and Lee, 2003; Lee, 2003). Further, the output of such time migration provides a superior, cost effective and efficient input for any subsequent depth migration.

Current Invention

The current invention discloses improved methods for constructing a premigration velocity model by the preferred steps of: 1) editing to avoid embedding velocity errors and to improve lateral velocity trends of seismic velocities; 2) better fitting of vertical velocity trends by calibrating seismic (soft) data to well (hard) data (checkshot and/or sonic logs); 3) more accurately interpolating velocities and calibration scale factors using geostatistical techniques; 4) incorporating geologic features, such as known stratigraphic horizons, into a stratigraphic grid, when their positioning accuracy is verified, and otherwise utilizing known geologic features for editing; and 5) avoiding excessive smoothing by using a variation of geostatistical collocated co-Kriging for localized anomalies.

The invention teaches that curved-ray prestack time migration will correctly accommodate a vertical velocity gradient. Further, the prestack curved ray time migration results using the instant invention provide superior focusing of seismic events, including steeply dipping events, and excellent well ties. Due to well ties, more accurate stratigraphic horizons can be interpreted. A second velocity calibration (to hard data and geologic data) and (geologically sensitive) trend fitting (together referred to as "iDEPTHing") before subsequent prestack depth migration can significantly accommodate lateral velocity variations above a prospect. For sub-salt prospects, the inventive methods can provide valuable calibrated velocity data in above top salt for constructing a geologically plausible initial model for prestack depth migration.

Geostatistical methods have been used in other disciple, such as reservoir characterization. Interpreters have used velocity calibration. Some predecessors have attempted to calibrate well (hard) and seismic (soft) data prior to migration. The current invention, however, is the first to specifically disclose a unique (referred to as "iDEPTHing" process for calibration prior to prestack time and/or depth migration as well as its surprising value when combined with curved-ray prestack time migration, and when then subsequently used with depth migration.

SUMMARY OF THE INVENTION

The instant invention discloses an improved method for constructing a 3D geologically plausible velocity model that has particular value for efficient and accurate prestack imaging. Embodiments of the invention provide: (1) a method for calibrating seismic velocity data, appropriately and effectively taking into account hard data, geological features and utilizing geostatistically sensitive trend fitting (together referred to as "iDEPTHing") for interpolating, which is particularly valuable for producing RMS velocities for use with curved-ray prestack time migration; (2) a similar method for calibrating and trend fitting ("iDEPTHing") interval velocities before prestack depth migration, again appropriately and effectively taking into account well (hard) and seismic (soft) data as well as geological features and geostatistical interpolation; and (3) a method for efficient sequential use of iDEPTHing in curved-ray prestack time migration followed by further iDEPTHing and prestack depth migration. Advantages of the embodiments include providing a quick turnaround for prestack time and depth migration images to interpreters and reducing resource-intensive interpretation efforts for 3D seismic data. The invention has significant implications for improving oil and gas exploration and production technologies, including pore pressure prediction, prospect evaluation and seismic attribute analysis.

Proper calibration and trend fitting of seismic RMS and interval velocities before prestack migration is a key aspect of the instant inventive method, leading to efficient and successful prestack imaging and interpretation of 3D seismic data. Experiment shows that a proper velocity calibration and trend fitting prior to curved-ray presack time migration can provide seismic data with excellent imaging and accurate well ties. Further velocity calibration and trend fitting of interval velocities can provide a further improved geologically plausible velocity model to enhance pre-sack depth migration, both in terms of the speed and the quality of the results.

Editing seismic velocities using geologic constraints is valuable for effective calibration. Use of stratigraphic surfaces can further play a helpful role in more accurately calibrating seismic velocities. Geostatistical methods (variogram modeling and Kriging) are key factors in interpolating seismic velocities and/or calibration scale factors. A scale of geological heterogeneities is better used for smoothing instead of an arbitrary scale.

The inventive procedure provides a method of velocity calibration and trend fitting (together referred to herein as "iDEPTHing") for velocity modeling prior to curved-ray prestack time migration. Such time migration, in turn, offers an improved stepping-stone for efficiently and effectively constructing an accurate 3D velocity model for prestack depth migration.

The invention can be implemented in specific preferred procedures for editing, calibrating and trend fitting, thereby effectively integrating well (hard) data, geological data and seismic (soft) data The ("iDEPTHing") procedure can be supplemented by interactive software packages.

BRIEF DESCRIPTION OF THE DRAWINGS

A better understanding of the present invention can be obtained when the following detailed description of the preferred embodiments are considered in conjunction with the following drawings, in which:

FIG. 1: illustrates two basic steps of one embodiment of the current inventive method for velocity calibration and trend fitting for prestack time migration and geologically plausible velocity modeling for prestack depth migration.

FIG. 2: illustrates preferred steps for velocity calibration and trend fitting ("iDEPTHing") for curved-ray prestack time migration.

FIG. 5: illustrates Velocity Editing. (a) A base map and velocity locations (red cross) comprising selected locations with pre-existing salt contours (yellow and blue) and faults (green and black); (b) interval velocities (red lines) with a geological constraint envelope (blue) which is computed and checked with geology; (c) time-interval velocity data from two selected locations (blue and black lines) before editing; (d) the same time-interval velocity data from two selected locations after editing including resampling, median and damped-least-square filtering. Note: a couple of isolated points were moved into the red envelope by applying filtering.

FIG. 6: illustrates velocity editing. (a) A base map showing lateral velocity trends in colors (cool colors are slow) in three (northern, mid and southern) blocks at four seconds; (b) RMS velocities with a geological constraint envelope (blue) for the entire area showing velocity trends; (c) southern blocks with slow velocity trends with global envelope (green) and local envelope (blue); (d) and (e) mid and northern blocks show faster velocity trends.

FIG. 8: illustrates Checkshot Data (a) Time vs. Depth curve from measured data; (b) time vs. average velocity derived from checkshot data; (c) time vs. interval velocity derived from checkshot data.

FIG. 9: (a) A checkshot average velocity (bright blue) was compared with neighboring seismic velocities (blue lines); (b) a checkshot RMS velocity (bright blue) was compared with seismic average velocities (blue lines); and (c) a checkshot interval velocity (bright blue) was computed with seismic interval velocities (blue lines).

Figure 3:
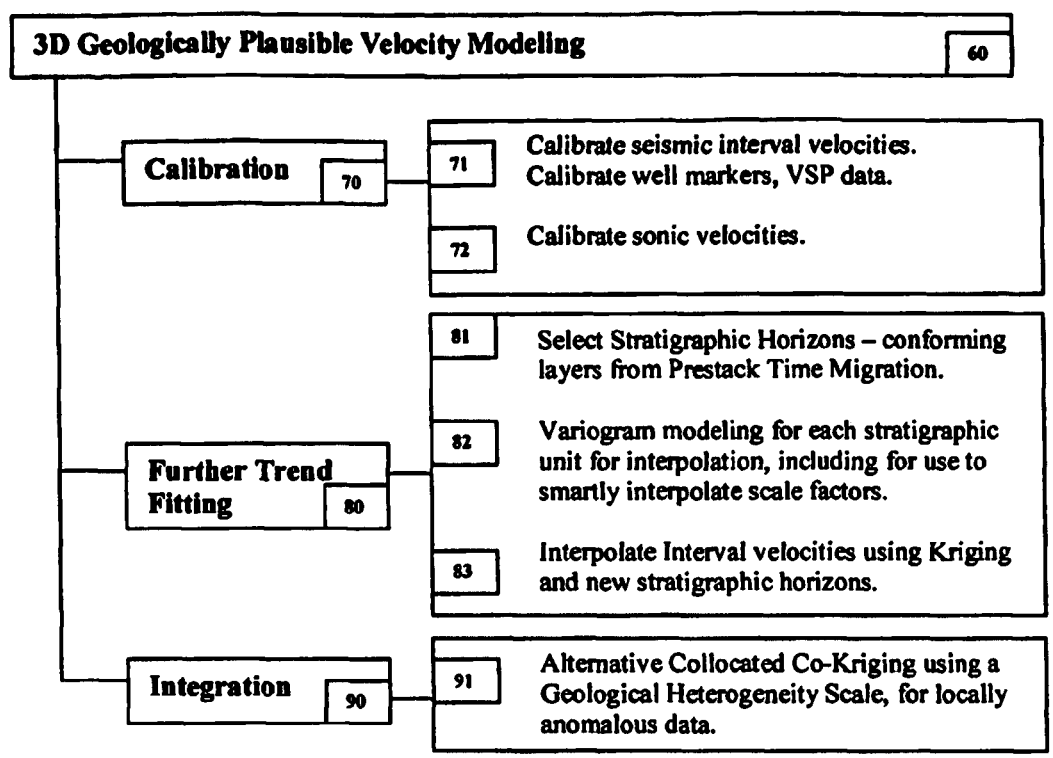
FIG. 3: illustrates preferred steps for velocity calibration and trend fitting ("iDEPTHing"), and for constructing a geologically plausible velocity model for prestack depth migration.

Checkshot RMS and interval velocities were derived from checkshot data for comparison.

FIG. 10: illustrates Stratigraphic Modeling. (a) Three stratigraphic surfaces; (b) a cross-section with layer boundaries; (c) an upper stratigraphic unit with a well; and (d) a lower stratigraphic unit with a well are shown. Two stratigraphic units have stratigraphic grids and the shape of grids are irregular but conforming with two stratigraphic horizons.

FIG. 11: illustrates Calibration Process. (a) Pre-calibration seismic RMS velocity contours; (b) post-calibration seismic RMS velocity contours; and (c) Calibration Table, showing tabulated velocities before and after calibration and scale factors. Well derricks indicate well locations, numbered counterclockwise starting from far right, and thin lines indicate locations of seismic velocity analysis.

FIG. 12: (a) A velocity trend map at three seconds with known salt contours (blue and yellow lines) and faults (purple and black lines); and (b) interval velocity data show vertical trends with colors. A horizontal line indicates time equals three seconds. Warm colors indicate fast velocities and cool colors indicate slower velocities using a rainbow scale. Purple color indicates no data zone.

FIG. 13: A variogram map on a stratigraphic horizon, shows NE direction as the direction of maximum spatial continuity. Colors indicate normalized variogram values. Two red dots and an ellipse are variogram modeling tools for finding the direction of maximum continuity and computing variogram values in major and minor axes of ellipse.

FIG. 14: (a) A base shows the location of Line A to B (red line) and known salt contours and well locations; (b) Line A to B (base map) of curved-ray prestack time migration result shows excellent imaging of steep salt face reflection (inside yellow ellipse), faults. It also shows excellent ties to well markers: Dn (green), Bh (red), Ym (yellow) and salt (pink) inside yellow circles. Vertical scales are time and horizontal scales are line and trace locations.

FIG. 15: illustrates a comparison of two prestack time migration. (a) Previous 1999 prestack time migration result; (b) current 2003 prestack time migration result shows significantly improved imaging of salt flank and faults, wherein the accuracy of the location of salt is critical for defining oil compartments; (c) a depth slice shows oil compartment defined by the location of salt and faults; (d) well planning by dotted red line indicates a successful drilling path close to the salt face compared to a failed drilling path (black line). Detailed sand columns are indicated by varying colors.

FIG. 16: illustrates curved ray prestack migration results. (a) prestack time migration without velocity calibration and trend fitting; (b) presack time migration with velocity calibration and trend fitting showed improved images. The above two sections show significantly different well markers (green bar: DN, pink bar: salt) ties with seismic data (yellow circles). Interpreters agreed that (b)-section shows excellent ties to well markers as a result of using RMS velocities with calibration and fitting. Horizontal scales indicated Line and Trace locations and the vertical scale indicates Time in seconds.

FIG. 17: illustrates common image point gathers, showing consistent prediction of times between different offset traces, which indicate small velocity errors. Small residual errors indicate that the velocity model was accurate for imaging.

DESCRIPTION OF THE PREFERRED EMBODIMENTS

Discussion of Terms

Time And Depth Migration

Seismic migration methods are classified as either depth migration or time migration. Depth migration honors lateral as well as vertical variations, utilizing different assumptions about the physics of seismic wave propagation. Time migration solutions ignore wave-field distortions created by lateral variations in seismic velocities. However simplistic, time migration is widely used because it is less computationally expensive. Curved-ray time migration is a recent advance in prestack time migration, which is sensitive to vertical velocity variations. However, it is only with the relatively recent advent of clustered PC processing that curved-ray prestack time migration has become generally available.

Checkshot Data

Checkshot is a method of determining an average velocity as a function of depth by lowering a geophone into a hole and recording energy from shots fired from surface shot holes. Checkshot is often run in addition to a sonic log to supply a reference time at the base of a casing to check an integrated time. Typical intervals between receivers are 250 to 500 feet. Some checkshot wells are vertical and some are deviated.

Sonic Logs

A sonic log measures interval travel time (ITT), which is the reciprocal of interval (P-wave) velocity in microseconds per foot. It is frequently used for porosity determination by time-average equation.

Geostatistics (Isaaks And Srivastava, 1989)

Geological and geophysical data come in discrete and incomplete forms. A common task for a geophysicist is to fill up the space between data points with reasonable estimates. The quantitative description of geological trends is analyzed by the variogram process and the interpolation method incorporating such variogram trend information is called Kriging. Geophysical data also comes with different measurement scales. Sonic logs are measured in every half foot, and seismic velocities are measured to 100 milliseconds, which corresponds to ~300 feet. Data of such different accuracies can be integrated in interpolation by a process called Co-Kriging.

Variogram (Isaaks And Srivastava, 1989)

In geostatistics, a variogram is a measurement of spatial variability. In common words, it indicates how data points in a defined space become uncorrelated as the distance between points increases.

Geostatistical Interpolation

Geostatistical interpolation refers to Kriging and Co-Kriging incorporating variogram trend information.

Velocity Functions

The term "velocity functions" is used to indicate common velocity parameters used in the industry, such as RMS velocity, interval velocity, and average velocity.

The term is intended to include such or equivalent (new or old) or newly developed or alternate velocity functions.

Selected Seismic Data

"Selected seismic data" indicates a use of less than a whole set of recorded Is traces from a 3D seismic data set.

Hard Data Sources

"Hard data sources" indicate sources of well data such as checkshot data, sonic data and log data.

Established

Use of the word "established" in reference to stratigraphic horizons is intended to indicate stratigraphic horizons that are accepted as relatively well known and/or are believed likely. There should be significant or strong substantiation for the existence of such horizons.

Alternative Collocated Co-Kriging

A variation of the collocated co-Kriging method, called Alternative Collocated Co-Kriging, is designed to incorporate geologic features causing large velocity anomalies. The method produces a smooth boundary with a large anomaly using estimation variances.

In general, see Background Information Table.

Discussion of Invention

The current invention is a method for: 1) efficiently generating imaging and well ties for 3D seismic data using prestack time migration; (2) improved velocity calibration to hard data and geological data, including geostatistically sensitive trend fitting, ("iDEPTHing") of RMS velocities for use in curved-ray prestack time migration; and (3) constructing an improved 3D geologically plausible velocity model for subsequent prestack depth migration.

The current invention is based on the following concepts.

Seismic velocities indicate lateral velocity variation faithfully but tend to be inaccurate and unreliable for vertical velocities, due to the hyperbolic moveout assumption.

Discrepancies between seismic velocities and well velocities are not necessarily due to anisotropy, as assumed by many people. They may be due to, and explained by, inaccuracies in seismic velocity analysis. Early calibration and trend fitting ("iDEPTHing") can surprisingly resolve many such inconsistencies in velocities derived from well (hard) data and seismic (soft) data (FIG. 9). The prominent discrepancies between seismic (soft) and checkshot (hard) data are due to geopressure in FIG. 9. The procedure can improve early estimated velocities in RMS, average and interval velocities.

An early accurate velocity model requires more than just seismic velocities from seismic data. Various other usable sources of velocity data are frequently available, and should be appropriately integrated into the model, such as checkshot, sonic, log, well markers, proximity surveys, VSP data and other geologic markers or descriptions. (The latter are typically referred to as hard data.) The value of checkshot and log data in adjacent blocks, in particular, is highlighted by the current invention.

Surprisingly, curved-ray prestack time migration can generate excellent seismic imaging and well ties if one first calibrates and trend fits (preferably edited) RMS velocities (with preferably edited) available hard data and geophysical data. A further improved 3D geologically plausible velocity model subsequently can be constructed by interpreting prestack time migration results.

Seismic velocities are preferably edited with the use of geologic constraints, to the extent available, and in particular, seismic interval velocities should be adjusted to be stable and be in agreement in terms of predictable rock properties. RMS velocities and average velocities are best derived from edited interval velocities.

Automated editing tools are particularly helpful for efficient volume editing.

Sophisticated calibration tools are particularly useful so that sparse well data can be smartly interpolated.

Geostatistical Interpolation (Kriging and Co-Kriging) is best utilized for smart interpolation, honoring different correlation lengths in lateral directions. Kriging is valuable for honoring the anisotropic correlation lengths.

Geostatistical methods are best used to integrate the well (hard) data and seismic (soft) data. An alternative method could use a geological heterogeneity scale. These methods best replace excessive smoothing, now popular in the industry.

A set of velocity tools best enable the current invention to proceed in steps, including editing, building stratigraphic units, and geostatistical interpolation methods and calibration including trend fitting. For quality control, the calibration and trend fitting results can be checked along well tracks and on curved well planes between wells.

Discussion of the Figures

FIG. 1 is a schematic flow chart illustrating a preferred embodiment of the current invention. In Steps 10-12 indicate velocity calibration of seismic RMS velocities with hard data and geostatistically sensitive trend fitting (together sometimes referred to as "iDEPTHing") before curved-ray prestack time migration, one key aspect of the current invention. Curved-ray prestack time migration accommodates vertical velocity gradients. The result surprisingly images well all seismic events and ties well markers. Such result alone can save interpreters significant time by not having to task for well ties.

Subsequently, migrated time data can be converted to depth using an average velocity cube, converted from the RMS velocity cube. The depth of any stratigraphic horizons produced should be accurate for velocity depth modeling in the next steps. Steps 20-22 indicate further velocity calibration, again with hard data and geostatistically sensitive trend fitting ("iDEPTHing"), for subsequent prestack depth migration. Such comprises an efficient method for constructing a geologically plausible initial interval velocity model. This model calibrated and trend fitted, takes advantage of the further information derived from the migrated time data. New stratigraphic horizons may have been identified.

According to the current industry practice, iterative prestack depth migration relies on cycling through Steps 24-28 without performing Steps 10-14 and 20-22. According to current industry practice, a macro model is constructed using interpreted horizons and interpolating velocity fields. This type of model has the following characteristics: 1) velocity errors are embedded due to lack of proper editing; 2) velocities are smoothed to hide the embedded errors; 3) the positioning of layer boundaries are not verified; and 4) vertical velocity trends are deviated whenever velocity reversals or large velocity gradients exist. Steps 10-14 and 20-22 can improve the initial velocity model by avoiding embedded velocity errors, avoiding excessive smoothing and by trend fitting using geostatistical Kriging.

For preferred embodiments of the present invention, more detailed steps are described in subsequent flow charts, indicating in more detail velocity editing, calibration and trend fitting in FIG. 2 and constructing a geologically plausible velocity model in FIG. 3.

FIG. 2 illustrates one preferred method for a preferred embodiment, indicating velocity editing, calibration and trend fitting for use in curved-ray prestack time migration.

Figure 4:
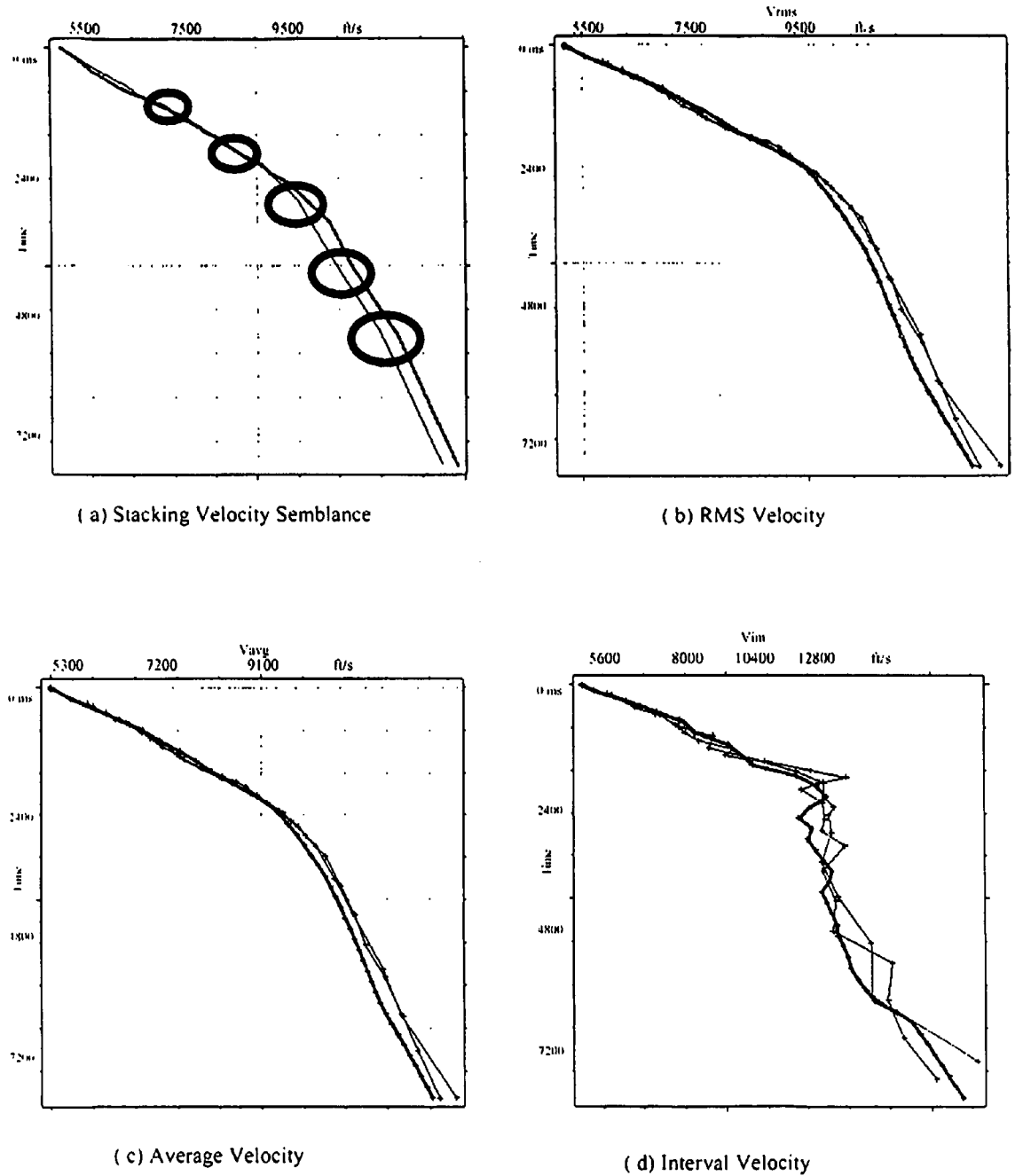
FIG. 4: illustrates seismic Velocity Types. (a) Stacking (or NMO) velocities (red and blue lines) are interpreted from semblance clouds (ellipses) which are generated from seismic data according to velocity analysis (note: personal bias can interpret semblance clouds differently); (b) RMS velocities are inferred from stacking velocities assuming the earth flat; (c) average velocities by time averaging of interval velocities; (d) interval velocities from the Dix equation as applied to prior RMS velocities. Three neighboring velocities are shown in FIGS. (b), (c) and (d).

(Step 40) Velocities are compiled from selected 3D prestack seismic data and interval and RMS velocities are edited honoring geologic trends that exist in the survey area. Seismic velocities can be edited using envelopes of vertical trends, based on rock properties and/or using computed envelopes. (See FIGS. 4, 5, and 6). Regional envelopes may be needed for an extensive area (FIG. 6). Envelopes form constraints. Editing can include resampling, to remove anomalies and/or applying median and damped-least-squares filters to RMS velocities. The RMS velocities and interval velocities may be edited with the help of interactive windows.

Lateral trends can be computed by geostatistical variogram modeling. (See FIGS. 12, 13). Geological maps, faults, geopressure zones, geological markers and salt intrusion can be viewed on an interactive workstation, including on dual windows, with one window for interval velocities and one window for RMS velocities.

Figure 7:
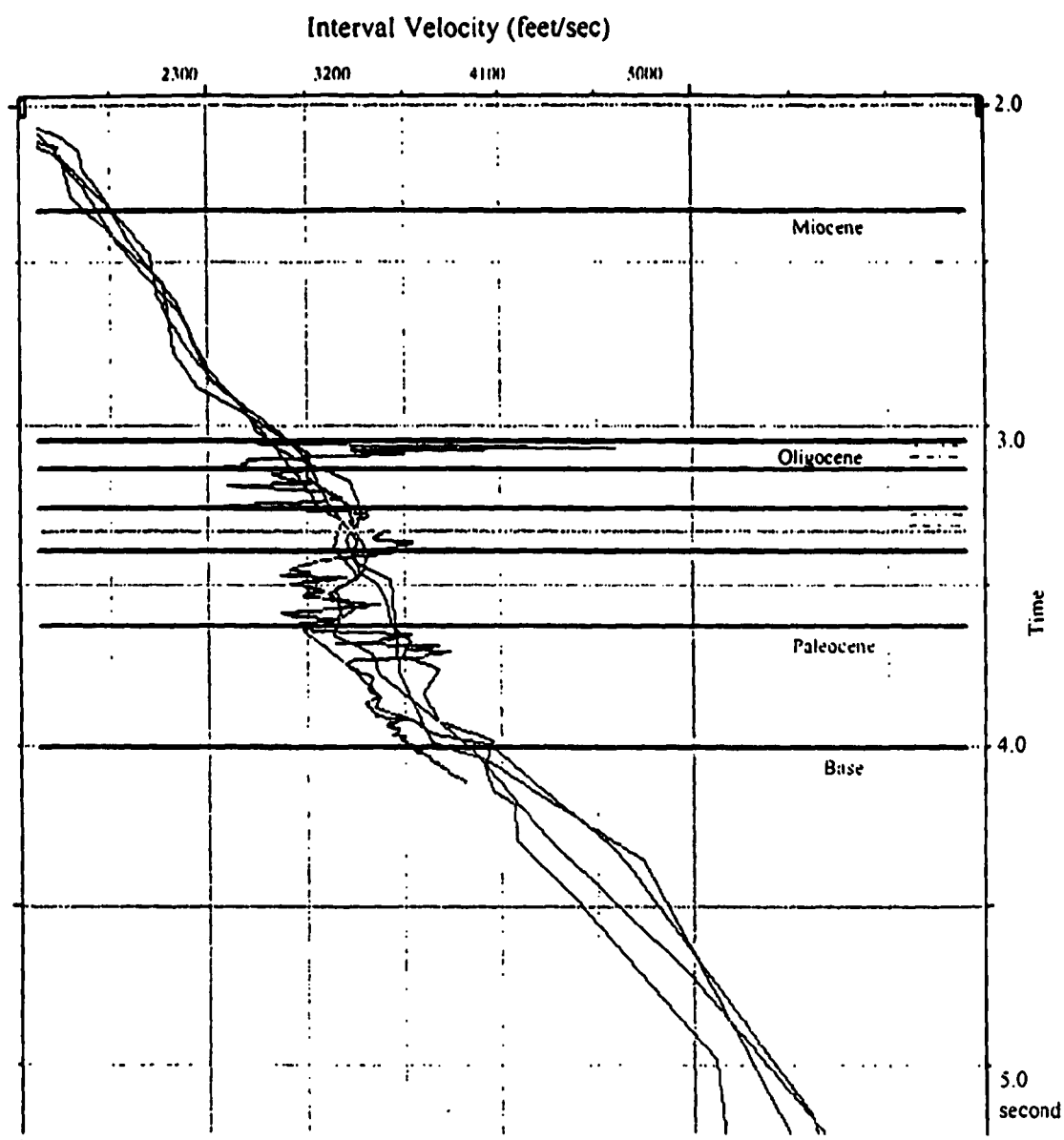
FIG. 7: illustrates geologic markers. Velocity trends between certain geologic markers were discerned from rock types and ages. The estimation of vertical velocity trends can be improved based on known rock types and again editing can be applied by choosing filter parameters and sampling rates in different geologic time windows according to information about rocks. A sonic (green) curve and four neighboring seismic (red) velocities are shown. Horizontal lines with name (MIOC, OLIG, . . . ) indicate the ages of rocks.

More particularly, the following steps can be taken for editing. Referencing step 41 of FIG. 2, one can convert computed seismic RMS velocities to interval velocities using the Dix equation, and to average velocities. Interval velocities are defined at the center of the layers (See FIG. 4). One can compute envelope interval functions by specifying upper and lower limits based on geologic constraints, to the extent available. One can then delete or correct erratic functions of picks, lying outside of envelope functions. (See FIG. 5). Referencing step 42 of FIG. 2, an alternative possibility is to resample the seismic data and/or also to apply median and damped-least-square filters on the RMS velocity domain. If rock properties are known between certain geologic markers (See FIG. 7), one can apply filters for user-defined time windows. Time-varying re-sampling is an option to consider for velocity trends between certain geologic markers. Any deleted velocity functions could alternately be assigned lower weights. Anomolous interval velocities can be corrected to their envelope value.

(Step 44) RMS velocities can now be calibrated, preferably using selected stratigraphic horizons which control sedimentation. (See FIG. 10). The following step can be taken for stratigraphic horizons.

Referencing step 43 of FIG. 2, known horizons controlling sedimentation styles due to compaction, if any, such as the water bottom horizon in the Gulf of Mexico, are selected. Such stratigraphic horizons provide conforming surfaces for velocity calibration. A conforming stratigraphic unit is built using, for example, two stratigraphic surfaces (See FIG. 10).

Referencing step 45 of FIG. 2, in order to calibrate RMS velocities, preferably using key controlling stratigraphic horizons, variogram models for velocity trends from seismic velocities are computed. (See FIGS. 11, 12 and 13). Checkshot and/or other hard well data (step 46) is edited to the extent feasible. (See FIG. 7). RMS and/or interval velocities are computed at well locations from hard data (step 47). (See FIG. 8). The next step is to interpolate seismic velocities to the locations of hard well data (step 48). One is now in a position to compute scale factors, preferably by dividing checkshot RMS velocities at well locations by seismic RMS velocities interpolated to the well locations (step 49). Geostatistical Kriging, using the variogram model of velocity trends, is used to interpolate the scale factors to the selected locations of seismic velocities (step 50). Calibrated seismic velocities are computed by applying (such as by multiplying) the interpolated scale factors to the seismic velocities (step 51). See FIG. 11.

(Note: Deviated checkshot and checkshot from adjacent blocks, if available, can be included for calibration.)

Again, checkshot and/or other hard data is also preferably first edited, such as by reviewing time vs. depth, time vs. average-velocity and time vs. interval-velocity relationship (See FIG. 8). Some checkshot data may be determined not to be used because it measures a local anomaly.

(Step 52) Kriging or Co-Kriging is applied to the calibrated seismic velocities at the select locations to geostatistically interpolate the calibrated velocities to all trace locations. The process includes fitting calibrated velocity data to computed velocity trends, consistent with geologic trends, for geostatistically sensitive trend fitting of the calibrated data.

Referencing step 53 of FIG. 2, one can further compute a time-slice of seismic velocities and check or match lateral velocity trends with geologic maps, if available (See FIG. 12).

Referencing step 54 of FIG. 2, one can further compute a variogram model of seismic velocities and compare or match it with "geologic trends", if available (See FIG. 13).

Referencing step 55 of FIG. 2, calibrated seismic RMS velocities are interpolated by the Kriging process on a stratigraphic grid to trace locations for use in prestack time migration. Calibrated seismic average velocities can also be geostatistically interpolated for time-to-depth conversion and depth interpretation.

Step 60 of FIG. 3 illustrates constructing a geologically plausible velocity model for subsequent prestack depth migration by the following steps.

In Step 71, seismic interval velocities are calibrated analogously to the above. The scale factor between true depth and migrated depth can be added into the scale factors computed from checkshot data. Salt entry points and proximity surveys can also be used for calibration in a similar manner to other hard data.

In Step 72, sonic (interval) velocities are resampled and calibrated. Sonic velocities can be calibrated with checkshot data to be consistent with calibrated seismic velocities.

For trend fitting as well as for use in calibration (steps 81 and 82), prestack time migration results can be interpreted and verified against well marker ties. Key stratigraphic horizons can be updated with time-to-depth conversion of time horizons (FIG. 14). Variogram models can be computed for each stratigraphic unit.

In Step 83, calibrated seismic interval velocities are interpolated to all trace locations on new-updated stratigraphic horizons for prestack depth migration.

In Step 80, similar geostatistical methods can be used to integrate sonic logs to seismic velocities, preserving the local effect of the data of the sonic log.

In Step 81, calibrated sonic (hard) data and seismic interval velocities (soft data) can be integrated by a geostatistical method. Alternative Collocated Co-Kriging is a preferred collocated co-Kriging method for such integration. Geologic heterogeneity scales are preferably used instead of an arbitrary smoothing scale (See FIGS. 14 and 15). Such scales are indicated by known anomalous geologic features Further Discussion Velocity calibration has traditionally been applied after migration, during interpretation. The instant invention teaches geologically sensitive velocity calibration is to be more profitably applied before preslack migration. Further, velocity editing is important and helpful before velocity calibration. Prestack migration with "iDEPTHing" improves both focusing and well ties.

Velocity trends can be carefully examined particularly in an extensive (ex. 200) block area. Several envelope functions can be computed for editing and preserving velocity trends toward the directions of rapid variation.

Stratigraphic horizons should be chosen if the boundary controls sedimentary layering. A good example is the water bottom in the Gulf of Mexico. Not every velocity layer boundary can be a stratigraphic horizon.

Checkshot data should be carefully verified and checked for any errors common in checkshot interval velocity. Checkshot calibration fits not only vertical trends but also lateral trends using a variogram model. Some checkshot data should not be used for calibration, however, if they represent local geology such as a local Carbonates seam. Sonic data can be summed for every 100 feet and block shifted to be used for calibration.

Geological features such as geo-pressure zones can be handled by the localized integration of sonic (hard) data. The integration is local within the geological heterogeneity scale using estimation variances.

The current invention teaches that a geologically plausible model can be constructed based on a starting isotropic earth assumption. Curved-ray prestack time migration results will tie well markers and provide a helpful guide for drilling prospects. Residual processing will enhance focusing and signal-to-noise ratio (See FIG. 17).

If the residual moveout becomes significant, anisotropy may be considered.

Anisotropy should be measured from a laboratory, however, and anisotropic prestack migration is needed for further improvement of seismic imaging and well ties. An anisotropic factor model can be constructed from residual velocity errors with calibration with anisotropy data from laboratory measurements.

The current invention can be developed to utilize shear-wave seismic data or multi-component seismic data, with minor modifications.

Historical Perspective

Curved-ray prestack time migration has been known in the industry for many years but was not practically available to most in the industry until PC clusters became a viable hardware solution. In the oil industry as major vendors started moving toward PC clusters, new algorithms, such as curved-ray prestack time migration, offering further accuracy became, generally, available.

Prestack time migration has typically been used for AVO studies and for seismic attribute studies. Traditionally, the industry has not paid attention to editing and improving RMS velocities for such time migration because time migration has been considered primarily as a process for increasing signal-to-noise ratios by collapsing diffractions. Because RMS velocities typically are smooth and monotonically increasing, and time migration results do not show any significant seismic image distortions therein due to velocity errors, it has historically been considered acceptable to use RMS velocities in time migration without checking the corresponding interval velocities converted from RMS velocities.

The present inventor is the first to disclose and teach that velocity calibration and trend fitting for prestack time migration greatly enhances the value of the results, for imaging and tying well markers, and can expedite more complicated depth migration. In December, 2002, the instant inventor persuaded Mr. Michael Kenney, a managing partner of Summit Energy Co. to try an experiment. The result was a remarkable success, correctly imaging all highly dipping salt faces and tying well markers on all sides. The results showed everything that Mr. Michael Kenney dreamed of seeing, including many interpretable geologic features.

The experiment substantiated that velocity calibration and trend fitting prior to curved-ray prestack time migration could yield amazing results in terms of imaging and well tying. Further, such prestack time migration could advantageously be used as an initial step for prestack depth migration and secure significant economies. Further calibration and trend fitting can constrain a velocity-depth model after prestack time migration.

The 2002/2003 Experiment ("Eureka")

The experiment tested the value of constructing a 3D geologically plausible velocity model prior to curved ray prestack time migration. The reprocessing of a proprietary 3D data set attempted to achieve the goal of extracting a high quality salt IS flank image as well as tying into wells around the salt. Seismic velocities were edited in the interval velocity domain using geologic constraints. RMS velocities were calibrated with geostatistically interpolated scale factors based on checkshot data and further trend fitted to trace locations. The water bottom was used as a stratigraphic horizon. The whole 3D seismic volume was migrated by curved-ray prestack time migration. The migration results provided excellent well ties on all sides of the salt structure in the survey area (FIGS. 14 and 16). The common image point gathers show consistencies in predicting times due to velocity accuracy (FIG. 17). Several reliable stratigraphic horizons can be interpreted from the curved-ray prestack time migration results. The calibration and trend fitting ("iDEPTHing") of interval velocities included well marker miss-ties and known salt entry points.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below.

What is claimed is:

1. A method for prestack time migration, including velocity calibration and trend fitting ("iDEPTHing") before curved-ray prestack time migration, comprising:
   a. editing seismic velocities, including at least one of honoring geologic trends existing in a survey area, using envelopes of vertical trends based on rock properties and using computed envelopes;
   b. computing lateral trends of RMS velocities derived from seismic data by geostatistical variogram modeling;
   c. preparing scale factors from well (hard) data and seismic (soft) data wherein the well (hard) data include at least one of checkshot data and up-scaled and bulk-shifted sonic logs;
   d. calibrating RMS velocities, including applying interpolated scale factors to RMS velocities wherein the interpolation is a function of the lateral trends; and
   e. curved-ray prestack time migration using interpolated calibrated RMS velocities, wherein the interpolation is a function of the lateral trends.

2. The method of claim 1 wherein editing of seismic velocity data includes weighing, and further includes converting seismic velocities to interval velocities using Dix equation and to average velocities wherein interval velocities are defined at the center of the layers; and at least one of:

a. computing envelope interval functions by specifying upper and lower limits based on geologic constraints and deleting and/or down weighting erratic functions of picks, lying outside of envelope functions; and
b. re-sampling and applying median and damped-least-square fillers on RMS velocity domain.

3. The method of claim 1 that includes calibrating seismic velocities using at least one key controlling stratigraphic horizon such that said stratigraphic horizon(s) provides conforming surfaces for velocity calibration.

4. The method of claim 3 that includes using at least one horizon controlling sedimentation style due to compaction.

5. The method of claim 1 that includes
deriving correction scale factors between well (hard) data and seismic (soft) data; and interpolating scale factors by geostatistical Kriging, where scale factors are computed by dividing checkshot RMS velocities with seismic RMS velocities at well locations; and computing calibrated velocities by multiplying scale factors.

6. The method of claim 1 that includes computing lateral trends of RMS velocities, consistent with geologic trends, by
a. computing a variogram model of seismic RMS velocities; and
b. adjusting the model to take into account at least one of geologic trends and velocity trends derived from well (hard) data; and that further include interpolating calibrated seismic RMS velocities by Kriging on a stratigraphic grid for prestack time migration using the adjusted variogram model.

7. The method of claim 1 wherein the well (hard) data includes a plurality of wells of checkshot data.

8. The method of claim 7 wherein sonic velocities are calibrated with checkshot data.

9. The method of claim 1 that includes viewing at least one of geological maps, faults, geo-pressure zones, geologic markers and salt intrusion on an interactive workstation.

10. The method of claim 1 that includes editing using envelopes and computing regional envelopes for a large survey area with hundreds of lease blocks.

11. The method of claim 1 wherein preparing scale factors includes at least one of deviated checkshot data and checkshot data from adjacent blocks in the well (hard) data.

12. The method of claim 1 that includes calibrating average velocities derived from seismic data, including applying interpolated scale factors to the average velocities, and interpolating the calibrated seismic average velocities for time-to-depth conversion and depth interpretation.

13. The method of claim 1 that includes interpolating scale factors by geostatistical Kriging, wherein scale factors are computed by dividing at least one checkshot and sonic interval (or average) velocities with seismic interval (or average) velocities at well locations; and computing calibrated velocities by multiplying scale factors.

14. The method of claim 1 wherein checkshot data includes at least one of deviated checkshot data and checkshot data from adjacent blocks.

15. The method of claim 1 that includes using at least one of salt entry points and proximity survey for calibration.

16. The method of claim 1 including adjusting lateral trends from seismic (soft) data with lateral trend from well (hard) data.

17. The method of claim 1 wherein the well (hard) data includes upscaled and bulk-shifted sonic logs, and that includes upscaling sonic logs by integrating transit times at every 100 feet or by fitting a polynomial function and bulk shifting to is fit the vertical trends wherein the shift caused due to missing data between the surface and logging depth 18. A method for velocity calibration and trend fitting ("iDEPTHing") before prestack depth migration comprising:
a. constructing a geologically plausible velocity model from seismic data for subsequent prestack depth migration;
b. computing variogram modeling of interval velocities;
c. calibrating interval velocities from the velocity model with hard well data and trend fitting the calibrated velocities using the variogram modeling ("iDEPTHing");
d. interpreting prestack time migration results;
e. verifying well marker ties;
f. updating key horizons based on the verifying;
g. repeating steps a.-f at least once; and
h. prestack depth migrating seismic data using the calibrated, trend fitted velocity model.

19. The method of claim 18 that includes calibrating seismic interval velocities using stratigraphic horizons by
a. selecting at least one stratigraphic horizon, which will provide at least one conforming surface for interpolating interval velocities;
b. interpreting and updating stratigraphic horizons after curved-ray prestack time migration for use with prestack depth migration; and
c. calibrating at least one of interval or average velocities using key controlling stratigraphic horizons.

20. The method of claim 18 wherein computing variogram modeling of interval velocities includes:
a. adjusting the modeling with at least one of geologic trends and velocity trends from well (hard) data;
b. building a conforming stratigraphic unit using at least two updated stratigraphic surfaces; and
c. interpolating seismic interval velocities on a new stratigraphic grid for pre-stack depth migration.

21. The method of claim 18 wherein calibrating interval velocities includes applying to the interval velocities an interpolated scale factor, the scale factor being a function of well (hard) data and seismic (soft) data and that includes adding a scale factor between true depth and migrated depth into the scale factor computed from hard and soft data.

22. A velocity model for use in time migration of 3D prestack seismic data, comprising:
geostatistically interpolated, calibrated velocity function values associated with 3D prestack seismic data trace locations, the geostatistically interpolated, calibrated velocity function values being a function of the application of geostatistical interpolation to calibrated velocity functions, the calibrated velocity functions being the product of a combination of the geostatistical interpolation of at least one scale factor with a seismic (soft data) velocity functions derived from 3D prestack seismic (soft) data, and at least one scale factor being a function of a well (hard) data source; and
wherein the geostatistical interpolations are a function of lateral velocity trends developed from the 3D prestack seismic data.

23. The velocity model of claim 22, wherein the soft data (seismic) velocity functions have been edited.

24. The velocity model of claim 22 wherein the geostatistical interpolations use a stratigraphic grid based on at least one established stratigraphic horizon.

25. The model of claim 22 wherein the calibrated velocity function is the product of the combination of the geostatistical interpolation of at least two scale actors, each scale factor being a function of a separate well (hard) data source.

26. A method for developing a velocity model for use in migrating seismic data, comprising:

from 3D prestack seismic data, developing soft data (seismic) velocity functions for select locations and developing a variogram model of lateral velocity trends;

from a plurality of hard data sources, developing a set of scale factors for each source, each scale factor relating a hard data velocity function derived from the source and a seismic (soft data) velocity function;

geostatistically interpolating the scale factors and applying the interpolated scale factors to seismic (soft data) velocity functions to create calibrated velocity functions;

geostatistically interpolating the calibrated velocity function to trace locations; and wherein the geostatistical interpolations are a function of the variogram model.

27. The method of claim 26 that includes editing the seismic (soft data) velocity functions.

28. The method of claim 26 wherein the geostatistical interpolations utilize a stratigraphic grid based on at let one established stratigraphic horizon.

29. A method for enhanced time migration of 3D prestack seismic data, comprising:

generating soft data (seismic) velocity functions and lateral velocity trends from at least a portion of 3D prestack seismic (soft) data;

computing well (hard data) velocity functions from at least two sources of well (hard) data;

creating at least two sets of scale factors, each set associated with a source of well (hard) data, each scale factor a function of a well (hard) data velocity function and a seismic (soft data) velocity function;

applying interpolated scale factors to seismic (soft data) velocity functions to create calibrated velocity functions, and interpolating calibrated velocity functions to trace locations, the interpolation of scale factors and calibrated velocity functions being a function of the lateral velocity trends; and applying curved ray time migration to 3D prestack seismic data using the interpolated calibrated velocity functions.

30. The method of claim 29 wherein the seismic (soft data) velocity functions are edited.

31. The method of claim 29 wherein the interpolations utilize a stratigraphic grid incorporating at least one established stratigraphic horizon.

32. The method of claim 29 wherein the lateral velocity trends including variogram modeling and the interpolation includes Kriging.

33. The method of claim 29 that includes editing the hard data velocity functions.

34. An improved method for migrating 3D prestack seismic data comprising:

developing a calibrated, trend fitted RMS velocity model from 3D prestack seismic data and a plurality of hard data sources;

applying curved-ray time migration to the 3D prestack seismic data using the velocity model;

developing a calibrated trend fitted interval velocity model incorporating at least one horizon derived from the previously migrated data; and depth migrating the 3D prestack seismic data using the calibrated, trend fitted interval velocity model.

35. The method of claim 34 that includes iterating over the steps of developing the interval velocity model and depth migration until a satisfactory convergence is established.

* * * * *